(12) United States Patent
Iwata et al.

(10) Patent No.: US 9,494,832 B2
(45) Date of Patent: Nov. 15, 2016

(54) LIQUID CRYSTAL DISPLAY DEVICE

(71) Applicant: Sharp Kabushiki Kaisha, Osaka (JP)

(72) Inventors: Yosuke Iwata, Osaka (JP); Mitsuhiro Murata, Osaka (JP);
(Continued)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/414,391

(22) PCT Filed: Jul. 16, 2013

(86) PCT No.: PCT/JP2013/069233
§ 371 (c)(1),
(2) Date: Jan. 12, 2015

(87) PCT Pub. No.: WO2014/017329
PCT Pub. Date: Jan. 30, 2014

(65) Prior Publication Data
US 2015/0153620 A1    Jun. 4, 2015

(30) Foreign Application Priority Data

Jul. 23, 2012 (JP) ................................ 2012-163070

(51) Int. Cl.
*G02F 1/1343* (2006.01)
*G09G 3/36* (2006.01)
(Continued)

(52) U.S. Cl.
CPC ....... *G02F 1/134309* (2013.01); *G02F 1/1337* (2013.01); *G02F 1/133345* (2013.01);
(Continued)

(58) Field of Classification Search
CPC ................................................. G02F 1/134309
See application file for complete search history.

(56) References Cited

U.S. PATENT DOCUMENTS 6,469,765 B1   10/2002 Matsuyama et al.
2003/0043336 A1  3/2003 Hanaoka
(Continued)

FOREIGN PATENT DOCUMENTS

| JP | 2000-356786 A | 12/2000 |
| JP | 2002-23178 A | 1/2002 |
| JP | 2007-286642 A | 11/2007 |

*Primary Examiner* — Paisley L Arendt
*Assistant Examiner* — Edmond Lau
(74) *Attorney, Agent, or Firm* — Chen Yoshimura LLP

(57) ABSTRACT

Provided is a liquid crystal display device having excellent viewing angle characteristics and high contrast in a display mode using both a vertical electric field and a horizontal electric field. This liquid crystal display device is provided with a first substrate and a second substrate disposed facing each other, and a liquid crystal layer held between said first and second substrates. The liquid crystal layer contains liquid crystal molecules having a negative dielectric anisotropy. The first substrate is provided with a flat plate first electrode, a first insulating layer, and a second electrode provided in a layer other than that of the first electrode and provided separated from the first electrode by the first insulating layer. The second electrode has multiple comb-tooth sections and multiple slits, and the second substrate has a flat plate third electrode. Defining $V_1$ as the potential difference between the first electrode and the third electrode, $V_2$ as the potential difference between the first electrode and the second electrode, and $V_{2\_B}$ as the potential difference between the first electrode and the second electrode when the lowest gradation is showed, $V_1$, $V_2$ and $V_{2\_B}$ satisfy $0<|V_{2\_B}|\leq|V_2|<|V_1|$.

13 Claims, 16 Drawing Sheets

(72) Inventors: Kohhei Tanaka, Osaka (JP); Akihito Jinda, Osaka (JP); Hidefumi Yoshida, Osaka (JP)

(51) Int. Cl.
*G02F 1/1333* (2006.01)
*G02F 1/1337* (2006.01)
*G02F 1/137* (2006.01)

(52) U.S. Cl.
CPC ....... *G09G 3/36* (2013.01); *G02F 2001/13712* (2013.01); *G02F 2001/133742* (2013.01); *G02F 2001/133773* (2013.01); *G02F 2001/134381* (2013.01); *G09G 2300/0447* (2013.01)

(56) References Cited

U.S. PATENT DOCUMENTS

2008/0316407 A1* 12/2008 Kim .................... G02F 1/13378
　　　　　　　　　　　　　　　　　　　　　　　　　349/124
2012/0169981 A1* 7/2012 Murata ............. G02F 1/134363
　　　　　　　　　　　　　　　　　　　　　　　　　349/138
2012/0229429 A1* 9/2012 Inoue ................ G02B 27/2214
　　　　　　　　　　　　　　　　　　　　　　　　　345/204

* cited by examiner

PRIOR ART

LIQUID CRYSTAL DISPLAY DEVICE

TECHNICAL FIELD

The present invention relates to a liquid crystal display device. More specifically, the present invention relates to a liquid crystal display device in which black is displayed when a vertical electric field is applied to liquid crystal with negative dielectric anisotropy, and white is displayed when a horizontal electric field is applied to this liquid crystal.

BACKGROUND ART

Liquid crystal display (LCD) devices are devices that control the transmission or blockage of light (turning ON/OFF the display) by controlling the orientation of liquid crystal molecules having birefringence. Examples of liquid crystal orientation modes of LCDs include the twisted nematic (TA) mode in which liquid crystal molecules having positive dielectric anisotropy are oriented so as to be twisted at 90° when viewed from a direction normal to the substrate, vertical alignment (VA) mode in which liquid crystal molecules having negative dielectric anisotropy are oriented vertically with respect to the substrate surface, and in-plane switching (IPS) mode and fringe field switching (FFS) mode in which a horizontal electric field is applied to liquid crystal layer to orient liquid crystal molecules having positive dielectric anisotropy horizontally with respect to the substrate surface.

In VA mode, display is performed by using liquid crystal having negative dielectric anisotropy and applying a vertical electric field to the liquid crystal molecules, which are oriented vertically with respect to the substrate surface, such that the liquid crystal molecules take on a more horizontal orientation, but when the liquid crystal molecules are viewed at different angles, the apparent birefringence thereof differs, which results in narrow viewing angle.

A method in which the orientation of the liquid crystal is partitioned by a technique of applying pretilt angles using a polymer (polymer sustained alignment (PSA)). A method of partitioning the orientation of the liquid crystal is proposed in which a voltage is applied to a liquid crystal layer containing a photocurable monomer, the liquid crystal molecules are oriented in multiple azimuth directions along slits formed in the pixel electrodes, and ultraviolet light is radiated when the orientation azimuths are stable to cure the photocurable monomers, thereby fixing the azimuth directions of the liquid crystal molecules (see Patent Document 1, for example).

In IPS mode, display is performed by relying on the movement of liquid crystal molecules towards a horizontal orientation in response to a horizontal electric field formed between a pair of comb-shaped electrodes. In FFS mode, display is performed by relying on the movement of liquid crystal molecules towards the horizontal orientation in response to a horizontal electric field (fringe field) formed between a common electrode and a pixel electrode provided over the common electrode across an insulating layer. Although the viewing angle is improved in IPS mode and FFS mode, it is difficult to attain a contrast ratio comparable to that attained in VA mode.

Also, in recent years, a new method has been proposed in which the driving of liquid crystal is controlled by generating a vertical electric field in addition to the conventional horizontal electric field in a liquid crystal display device that performs display using a horizontal electric field as done in IPS mode and FFS mode (see Patent Documents 2 and 3, for example).

RELATED ART DOCUMENTS

Patent Documents

Patent Document 1: Japanese Patent Application Laid-Open Publication No. 2007-286642
Patent Document 2: Japanese Patent Application Laid-Open Publication No. 2002-23178
Patent Document 3: Japanese Patent Application Laid-Open Publication No. 2000-356786

SUMMARY OF THE INVENTION

Problems to be Solved by the Invention

The present invention takes into account the above-mentioned situation, and an object thereof is to provide a liquid crystal display device having excellent viewing angle characteristics while having a high contrast ratio in a display mode using a horizontal electric field and a vertical electric field.

Means for Solving the Problems

The inventors of the present invention have focused on a configuration in which a total of three types of electrodes are used in one liquid crystal display device having a liquid crystal layer containing liquid crystal having negative dielectric anisotropy: a uniformly planar first electrode, and a second electrode having a plurality of teeth and a plurality of slits, provided in a layer different from the first electrode across an insulating layer, the first electrode and the second electrode being provided on one substrate; and a third electrode provided on a substrate across the liquid crystal layer from the aforementioned substrate.

The inventors of the present invention found that it is possible to change the azimuth direction of the liquid crystal molecules while keeping them horizontal with respect to the substrate surface by forming a vertical electric field (electric field formed in the thickness direction of the liquid crystal layer) in the liquid crystal layer by applying a voltage between the first electrode and the third electrode while forming a horizontal electric field by also applying a voltage between the second electrode and the first electrode. The "azimuth of the liquid crystal molecule" represents the long axis direction of the liquid crystal molecule when the substrate is viewed in a plan view.

As a result of further study, the inventors of the present invention also found that by setting the potential difference between the second electrode and the first electrode to a certain value while applying a voltage between the first electrode and the third electrode, the liquid crystal molecules orient to azimuth directions parallel to the lengthwise directions of the slits, thereby displaying a black image (display with the lowest transmittance). When the potential difference between the second electrode and the first electrode is increased, the liquid crystal molecules rotate while maintaining a horizontal orientation with respect to the substrate surface, and thus, the liquid crystal molecules are at an angle with respect to the lengthwise direction of the slit formed in the second electrode, thereby displaying a grayscale image or even a white image (image with the highest transmittance).

According to this method, it is possible to attain a liquid crystal display device having excellent viewing angle characteristics and high contrast ratio in a display mode differing from VA mode and FFS mode. Furthermore, the inventors of the present invention found that when the potential difference between the second electrode and the first electrode is greater than the potential difference between the first electrode and the third electrode, a vertical electric field is no longer formed and it is not possible to attain a desired orientation, and that by maintaining a state in which the potential difference between the first electrode and the third electrode is greater than the potential difference between the second electrode and the first electrode, it is possible to attain an excellent viewing angle and contrast ratio in this display mode.

Thus, the inventors of the present invention have arrived at a solution that elegantly solves the above-mentioned problem, and have arrived at the present invention.

In other words, one aspect of the present invention is a liquid crystal display device including: a first substrate and a second substrate opposing each other; and a liquid crystal layer sandwiched between the first and second substrates, wherein the liquid crystal layer contains liquid crystal molecules having negative dielectric anisotropy, wherein the first substrate includes a uniformly planar first electrode, a first insulating layer, and a second electrode provided in a different layer from the first electrode across the first insulating layer, wherein the second electrode has a plurality of teeth and a plurality of slits separating the teeth, wherein the second substrate includes a uniformly planar third electrode, and wherein the liquid crystal display device is configured such that $V_1$, $V_2$, and $V_{2\_B}$ satisfy the following formula (1) for each of gradation levels being displayed, where a potential between the first electrode and the third electrode is $V_1$, a potential between the first electrode and the second electrode is $V_2$, and a potential between the first electrode and the second electrode at a lowest gradation is $V_{2\_B}$.

(Formula 1)

$$0 < |V_{2\_B}| \leq |V_2| < |V_1| \quad (1)$$

The unit for $V_{2\_B}$, $V_1$, and $V_2$ is volts (V).

The liquid crystal layer contains liquid crystal molecules having negative dielectric anisotropy. The liquid crystal molecules have the characteristic of orienting in a direction perpendicular to the electric field when an electric field is applied.

The second electrode has a plurality of teeth and a plurality of slits, and is provided in a layer different from the first electrode across the first insulating layer. According to this configuration, it is possible to form a horizontal electric field (fringe field) between the second electrode and the first electrode.

Different potentials are supplied respectively to the first electrode and the third electrode. As a result, a potential difference is formed between the third electrode and the first electrode, between the first electrode and the second electrode, and between the third electrode and the second electrode, thereby forming a vertical electric field and an oblique electric field.

By $V_2$ changing within a range satisfying $|V_2|<|V_1|$, the liquid crystal molecules can rotate while oriented in the horizontal direction with respect to the substrate surface, thereby allowing an image ranging in gradation from black to white to be displayed.

$|V_2|$ is greater than 0. This means that when a black image is displayed, some potential difference is present between the first electrode and the second electrode. In a general liquid crystal display device of the VA mode, FFS mode, or the like, a black image is displayed when the potential difference between the pair of electrodes for applying a voltage to the liquid crystal layer is 0V, but in the present invention, when using both a vertical electric field and a horizontal electric field, the lowest transmittance cannot be attained when the potential difference between the first electrode and the second electrode is 0, which is why such a condition has been set.

The first and second substrates included in the liquid crystal display device are a pair of substrates for sandwiching a liquid crystal layer therebetween, and are formed by using insulating substrates made of glass, resin, or the like, for example, as bases and forming on the insulating substrates wiring lines, electrodes, color filters, and the like. In order to maintain a vertical electric field, it is preferable that an overcoat layer (permittivity $\in$=3 to 4) that planarizes the uneven surface be formed on the color filters.

It is preferable that the first substrate be an active matrix substrate including active elements.

As long as the liquid crystal display device includes such necessary components, it is possible to appropriately provide other components normally used in liquid crystal display devices.

Below, preferable aspects of the liquid crystal display device will be described. Aspects combining two or more of the individual preferable aspects of the liquid crystal display device disclosed below are also considered to be preferable aspects of the liquid crystal display device.

It is preferable that the value $V_{2\_B}$ satisfy the following formula (2).

(Formula 2)

$$0 < |V_{2\_B}| \leq \frac{\varepsilon_\perp d_1}{\varepsilon_1 d_{LC} + \varepsilon_\perp d_1}|V_1| + 0.5 \quad (2)$$

($d_{LC}$ represents the thickness of the liquid crystal layer, $\varepsilon_\perp$ represents a permittivity perpendicular to the director of the liquid crystal, $d_1$ represents the thickness of the first insulating layer, and $\varepsilon_1$ represents the permittivity of the first insulating layer)

If the first insulating layer is made of a plurality of different materials, the permittivity $\varepsilon_1$ of the first insulating layer is calculated from the permittivity and thickness of each of the materials. If, for example, the first insulating layer has a first material "a" and a second material "b," then the permittivity $\varepsilon_1$ of the first insulating layer is represented by the following formula (7).

(Formula 7)

$$\varepsilon_1 = \frac{\varepsilon_a \varepsilon_b (d_a + d_b)}{\varepsilon_a d_b + \varepsilon_b d_a} \quad (7)$$

($d_a$ is a thickness of the first material, $\varepsilon_a$ is the permittivity of the first material, $d_b$ is the thickness of the second material, and $\varepsilon_b$ is the permittivity of the second material)

It is preferable that the second substrate have an alignment film, that a second insulating layer be present between the third electrode and the alignment film, and that the value $V_{2\_B}$ satisfy the following formula (3).

(Formula 3)

$$0 < |V_{2\_B}| \le \frac{\varepsilon_2 \varepsilon_\perp d_1}{\varepsilon_1 \varepsilon_\perp d_2 + \varepsilon_1 \varepsilon_2 d_{LC} + \varepsilon_2 \varepsilon_\perp d_1}|V_1| + 0.5 \qquad (3)$$

($d_{LC}$ represents the thickness of the liquid crystal layer, $\varepsilon_\perp$ represents the permittivity in the direction perpendicular to the director of the liquid crystal, $d_1$ represents the thickness of the first insulating layer, $d_2$ represents the thickness of the second insulating layer, $\varepsilon_1$ represents the permittivity of the first insulating layer, and $\varepsilon_2$ represents the permittivity of the second insulating layer)

If the second insulating layer is made of a plurality of different materials, the permittivity $\varepsilon_2$ of the second insulating layer is calculated from the permittivity and thickness of each of the materials in a manner similar to the first insulating layer.

By having $|V_{2\_B}|$ satisfy formula (2) or (3), it is possible to attain excellent black display as described below.

By having the above-mentioned second insulating layer, it is possible to attain a high transmittance even if $|V_2|$ is low, and thus, the liquid crystal display device can be driven at a low voltage compared to a liquid crystal display device that does not having an insulating layer between the third electrode and the alignment film, as described below. The alignment film on the second substrate has a negligible thickness, and is therefore not included in the second insulating layer.

It is preferable that a width of each of the slits in the second electrode is 2 to 10 μm. Also, it is preferable that a width of each of the teeth in the second electrode be 2 to 10 μm. These ranges are preferred from the perspective of design limits and of achieving a transmittance by applying a sufficient voltage to the liquid crystal layer.

It is preferable that the second electrode have a trunk portion and that the plurality of teeth extend from the trunk portion in a direction perpendicular to a lengthwise direction of the trunk portion while collectively exhibiting linear symmetry about the trunk portion. According to such a structure, when displaying a mid-gradation or white image, it is possible to orient the liquid crystal molecules horizontally in four different azimuth directions, and thus, the viewing angle characteristics can be improved.

It is preferable that at least one of the first substrate and the second substrate has a vertical alignment film. If a second insulating layer is present between the third electrode and the alignment film, then it is preferable that the alignment film on the second substrate be a vertical alignment film. The vertical alignment film is an alignment film that causes liquid crystal molecules to be oriented perpendicularly with respect to the substrate surface when no voltage is being applied, and alignment treatment may be performed on the vertical alignment film. Rubbing treatment, photoalignment, and the like are examples of a method of alignment treatment. Vertical orientation refers to an orientation in which the average initial angle of inclination of liquid crystal molecules with respect to the substrate surface is 60° to 90°, and more preferably 80° to 90°. The "angle of inclination" is the angle of the long axis of the liquid crystal molecule with respect to the substrate surface in a range of 0° to 90°, and the "average angle of inclination" is sometimes referred to as the "tilt angle." Also, the average angle of inclination of the liquid crystal molecules with respect to the substrates when no voltage is applied is referred to as the "average initial angle of inclination," and sometimes referred to below as the "pretilt angle."

It is preferable that the first substrate have a horizontal alignment film with the second substrate having a vertical alignment film, or that the first substrate have a vertical alignment film with the second substrate having a horizontal alignment film. If a second insulating layer is present between the third electrode and the alignment film, then it is preferable that the first substrate have a vertical alignment film with the alignment film on the second substrate being a horizontal alignment film, or that the first substrate have a horizontal alignment film with the alignment film on the second substrate being a vertical alignment film. A horizontal alignment film aligns the liquid crystal molecules in the horizontal direction with respect to the substrate surface when no voltage is applied, and may be formed by applying an alignment treatment such as rubbing treatment or photoalignment. Horizontal orientation refers to an orientation in which the average initial angle of inclination of the liquid crystal molecules with respect to the substrate surface is 0° to 30°, and more preferably 0° to 10°.

Effects of the Invention

According to the present invention, it is possible to attain a liquid crystal display device having excellent viewing angle characteristics and high contrast in a display mode using both a vertical electric field and a horizontal electric field.

DETAILED DESCRIPTION OF EMBODIMENTS

Embodiments are shown below and the present invention is described in further detail with reference to the drawings, but the present invention is not limited to these embodiments.

Embodiment 1

Figure 1:
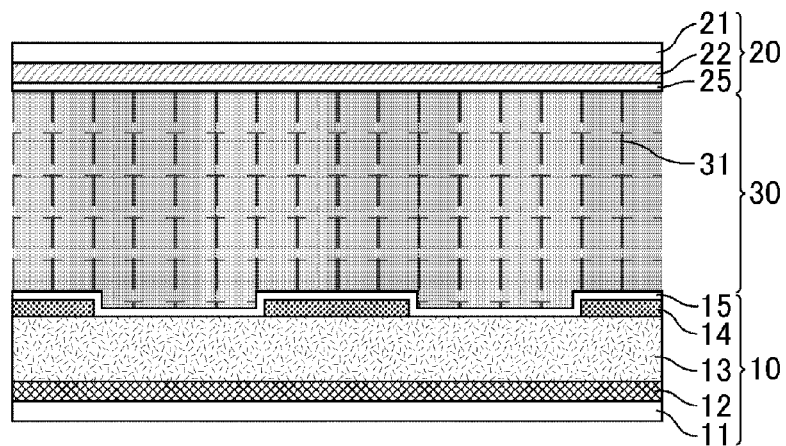
FIG. 1 is a schematic cross-sectional view of a liquid crystal display device according to Embodiment 1 when no voltage is applied.
Figure 2:
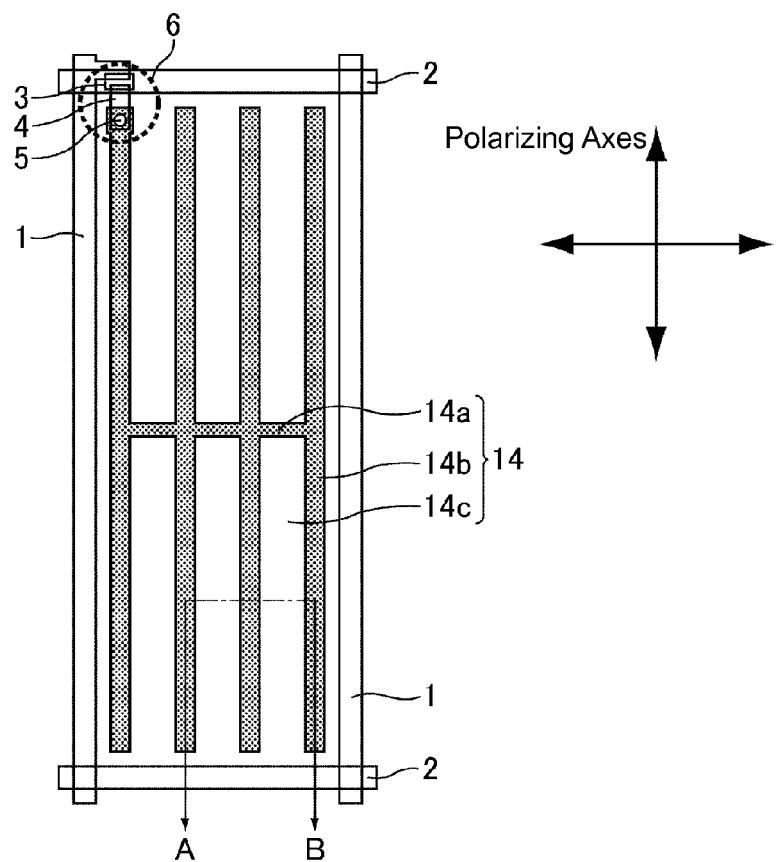
FIG. 2 is a schematic plan view of one pixel of the liquid crystal display device of Embodiment 1.

FIG. 1 is a schematic cross-sectional view of a liquid crystal display device according to Embodiment 1 when no voltage is applied, and FIG. 2 is a schematic plan view of one pixel of the liquid crystal display device of Embodiment 1. FIG. 1 is also a schematic cross-sectional view of FIG. 2 along the line A-B. In Embodiment 1, the first electrode and third electrode are common electrodes, and the second electrodes are pixel electrodes.

The liquid crystal display device of Embodiment 1 includes a first substrate 10, a second substrate 20, and a liquid crystal layer 30 sandwiched between the first substrate 10 and the second substrate 20. The liquid crystal layer 30 contains liquid crystal molecules 31 having a negative dielectric anisotropy. The first substrate 10 includes a support substrate 11, thin film transistors (TFTs), data signal lines, scan signal lines, a first common electrode 12 (first electrode), pixel electrodes 14 (second electrodes), an insulating layer 13 (first insulating layer) that electrically separates the first common electrode 12 from the pixel electrodes 14, and a vertical alignment film 15. The second substrate 20 includes a support substrate 21, a second common electrode 22 (third electrode), a vertical alignment film 25, color filters, and a black matrix.

The plurality of data signal lines 1 extend in the vertical direction of the liquid crystal display device, the plurality of scan signal lines 2 extend in the horizontal direction of the liquid crystal display device, and the TFTs 6 are respectively formed in the vicinity of the respective intersections between the data signal lines 1 and the scan signal lines 2. The TFTs 6 are each formed of respective portions of the data signal line 1, the scan signal line 2, and a drain lead-out wiring line 4, and of a semiconductor layer 3, and function as switching elements. The pixel electrodes 14 are connected to the drain lead-out wiring lines 4 extending from the TFTs 6 through contact holes 5. When the TFT 6 is turned ON by a scan signal supplied through the scan signal line 2, the semiconductor layer 3 becomes conductive, and a data signal is supplied to the pixel electrode 14 through the data signal line 1.

The pixel electrode 14 is provided at each region surrounded by the data signal lines 1 and the scan signal lines 2. The pixel electrode 14 includes a trunk portion 14a and a plurality of teeth 14b. The trunk portion 14a extends to bisect the pixel vertically into two equal parts, and the plurality of teeth 14b extend from the trunk portion 14a in a direction perpendicular to the lengthwise direction of the trunk portion. The teeth 14b are formed to exhibit line symmetry about the trunk portion 14a. Slits 14c are present between adjacent teeth 14b. In Embodiment 1, the pixel electrode 14 has a comb structure in which one end of each slit 14c is open. Also, in Embodiment 1, no comb-shaped electrode opposing the pixel electrode 14 is provided, and the horizontal electric field (fringe field) is formed only between the pixel electrode 14 and the first common electrode 12.

It is preferable that the width of the trunk portion 14a and each of the teeth 14b be 2 µm to 10 µm, and that the width of each slit 14c be 2 µm to 10 µm. If the width of the slit is less than 2 µm, then the area of the actual transmissive portion is reduced, but if the width is greater than 10 µm, then the fringe field becomes weaker, which can result in slow switching of liquid crystal molecules. As shown with two double-headed arrows in FIG. 2, the polarizing plates are arranged in a crossed Nicols state such that the polarizing axes are respectively parallel or perpendicular to the lengthwise direction of the slit 14c. As for the arrangement of the polarizing axes in the present specification, "substantially parallel" and "substantially perpendicular" include a margin of error of 3°.

The first common electrode 12 is formed in a uniformly planar manner on the first substrate 10, and the pixel electrodes 14 are formed thereover across the insulating layer 13. The insulating layer 13 can be made of an organic film including an organic material such as an acrylic resin (permittivity $\in$=3 to 4), an inorganic film including an inorganic material such as silicon nitride (permittivity $\in$=5 to 7), or the like. The insulating layer 13 is 0.2 to 2 µm in thickness, for example, and more preferably 0.3 to 1.5 µm in thickness. The first common electrode 12 is supplied a common potential of 0V, for example.

The second common electrode 22 is formed in a uniformly planar manner on the second substrate 20 and is supplied a potential of |4|V to |15|V, for example. If the potential difference between the second common electrode 22 and the first common electrode 12 is $V_1$, and the potential difference between the first common electrode 12 and the pixel electrode 14 is $V_2$, then a potential of |0.3|V to |10|V is supplied to the pixel electrode 14 such that $|V_2|$ is less than $|V_1|$.

The first substrate 10 and the second substrate 20 respectively have vertical alignment films 15 and 25 on surfaces thereof facing the liquid crystal layer 30. An alignment treatment need not be performed on the vertical alignment films 15 and 25, but by performing alignment treatment on either or both of the vertical alignment films 15 and 25, it is possible to define the orientation azimuth of the liquid crystal molecules when a black image is being displayed. By performing alignment treatment, the liquid crystal molecules 31 have a prescribed pretilt angle with respect to either or both of the substrate surfaces when no voltage is applied. If the pixel electrode 14 has a trunk portion 14a that is formed across the center of the pixel as shown in FIG. 2, for example, then the liquid crystal molecules 31 can be oriented in the up-and-down direction (azimuth parallel to the lengthwise direction of the slits) of the pixel, with the trunk portion of the pixel electrode 14 being the symmetry axis, by performing alignment treatment in an azimuth direction parallel to the lengthwise direction of slits, and thus, it becomes possible to attain a wide viewing angle as will be described below.

In Embodiment 1, a technique to apply a pretilt angle using a polymer formed in the respective boundaries between the liquid crystal layer 30 and the substrates 10 and 20 (PSA technique) may be adopted. In such a case, it is possible to orient the liquid crystal molecules 31 so as to have an azimuth parallel to the lengthwise direction of the slits 14c of the pixel electrode when voltage is applied, without performing alignment treatment. The PSA technique may be used in addition to alignment treatment, which can improve anchoring and stabilize the orientation azimuth of the liquid crystal molecules 31. This PSA technique can be adopted by applying a voltage to a liquid crystal layer 30 containing liquid crystal and a photopolymerizable monomer, and radiating ultraviolet light thereon in a state in which the liquid crystal molecules 31 are oriented at an azimuth parallel to the lengthwise direction of the slits 14c of the pixel electrode, thereby polymerizing the monomer.

Below, driving principles of a liquid crystal display device of Embodiment 1 of the present invention will be described.

A state when no voltage is applied will be described with reference to FIG. 1. When no voltage is applied, this means that no potential is applied to the first common electrode 12, the second common electrode 22, or the pixel electrodes 14, and $V_1$ and $V_2$ are both 0V. When no voltage is applied, the liquid crystal molecules 31 are oriented perpendicularly with respect to the surfaces of the first substrate 10 and the second substrate 20.

Figure 3:
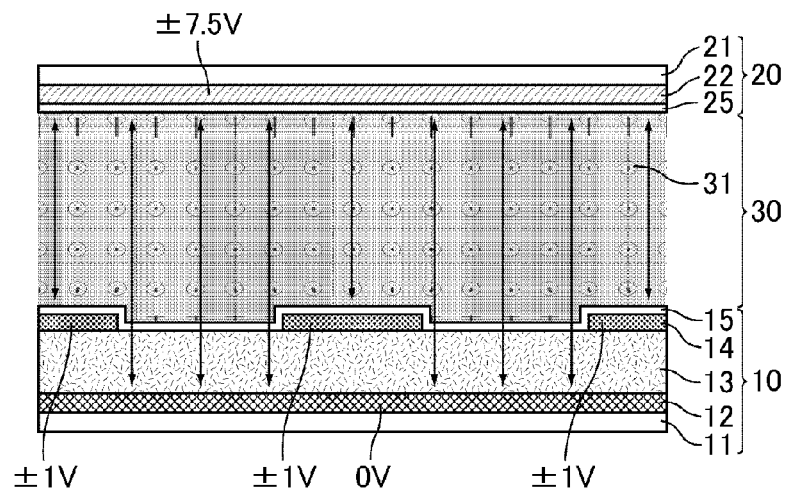
FIG. 3 is a schematic cross-sectional view of the liquid crystal display device according to Embodiment 1 when a black image is being displayed.
Figure 4:
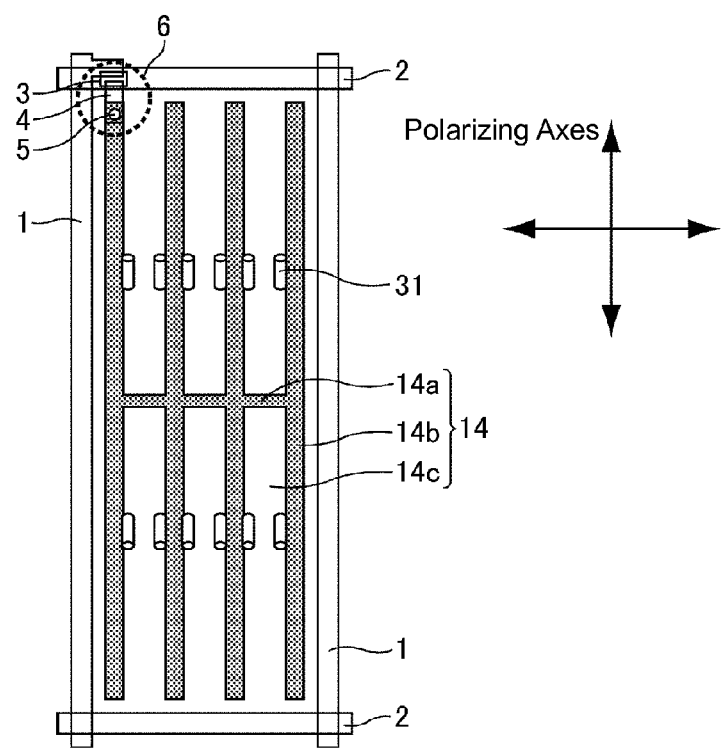
FIG. 4 is a schematic plan view of one pixel of the liquid crystal display device according to Embodiment 1 when a black image is being displayed.

The display of a black image will be described with reference to FIGS. 3 and 4. FIGS. 3 and 4 are schematic drawings showing a liquid crystal display device of Embodiment 1 during black display; FIG. 3 is a schematic cross-sectional view, and FIG. 4 is a schematic plan view of one pixel. In FIG. 3, the double-headed arrows represent the direction of the electric field.

In FIG. 3 shows an example in which a 0V potential is applied to the first common electrode 12, a ±7.5V potential is applied to the second common electrode 22, and a ±1V potential is applied to the pixel electrode ($|V_1|$=7.5 and $|V_2|$=1). As shown in FIG. 3, a vertical electric field is formed in the liquid crystal layer 30 and the liquid crystal molecules 31 have negative dielectric anisotropy, and thus, the liquid crystal molecules 31 are oriented towards a direction perpendicular to the electric field, causing the liquid crystal molecules 31 to be oriented parallel to the surfaces of the first substrate 10 and the second substrate 20. As shown in FIG. 4, when viewing this state in a plan view, the liquid crystal molecules 31 are oriented at an azimuth parallel to the lengthwise direction of the slits 14c of the pixel electrode 14. The polarizing plates are bonded to the outer surfaces of the first substrate 10 and the second substrate 20, and these are arranged such that the polarizing axes are respectively substantially parallel or substantially perpendicular to the lengthwise direction of the slits 14c and in a crossed Nicols state with each other, and thus, in the state shown in FIG. 3, light from the backlight is blocked by the polarizing plates.

In Embodiment 1, a potential greater than 0V is applied to the pixel electrode when a black image is being displayed. By gradually increasing the potential applied to the pixel electrode 14 from 0V, the potential difference between the pixel electrode 14 and the first common electrode 12 reaches a certain value, at which point an equipotential plane parallel to the substrate surface is formed over the teeth 14b and the slits 14c of the pixel electrode in the vicinity of the boundary between the first substrate 10 and the liquid crystal layer 30, thereby forming an even vertical electric field in the liquid crystal layer 30.

If $V_2$, when the even vertical electric field is applied to the liquid crystal layer 30, is $V_{2\_0}$, then $V_2$ is represented by the following formula (4):

(Formula 4)

$$V_2 = \frac{\varepsilon_\perp d_1}{\varepsilon_\perp d_{LC} + \varepsilon_\perp d_1} V_1 (= V_{2\_0}) \tag{4}$$

($d_{LC}$ represents the thickness of the liquid crystal layer, $\varepsilon_\perp$ represents a permittivity perpendicular to the director of the liquid crystal, $d_1$ represents the thickness of the first insulating layer, and $\varepsilon_1$ represents the permittivity of the first insulating layer)

In the liquid crystal display device of Embodiment 1, if the potential difference between the first common electrode 12 and the pixel electrode 14 is $V_{2\_B}$ when a black image is being displayed, then it is preferable that $V_{2\_B}$ be within the range set in formula (5) below:

(Formula 5)

$$0 < |V_{2\_B}| \le |V_{2\_0}| + 0.5 \tag{5}$$

In other words, it is preferable that $V_{2\_B}$ be within the range of formula (2) below:

(Formula 2)

$$0 < |V_{2\_B}| \le \frac{\varepsilon_\perp d_1}{\varepsilon_1 d_{LC} + \varepsilon_\perp d_1} |V_1| + 0.5 \tag{2}$$

Figure 5:
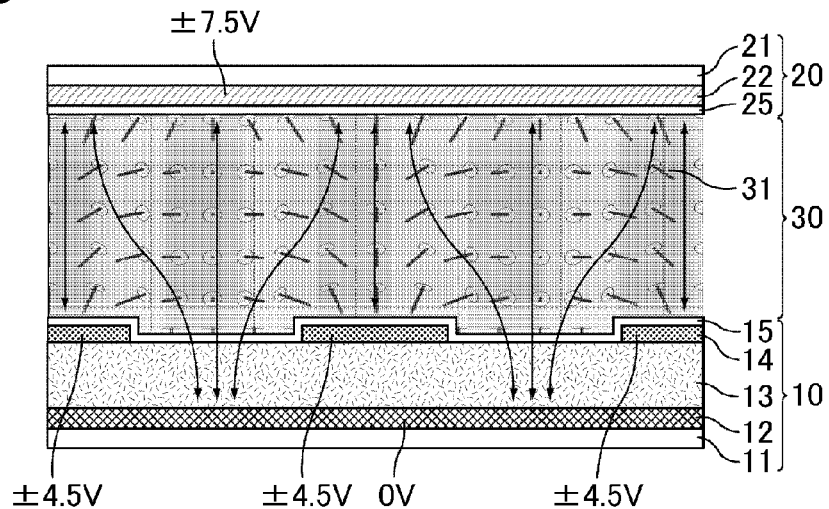
FIG. 5 is a schematic cross-sectional view of the liquid crystal display device according to Embodiment 1 when a white image is being displayed.
Figure 6:
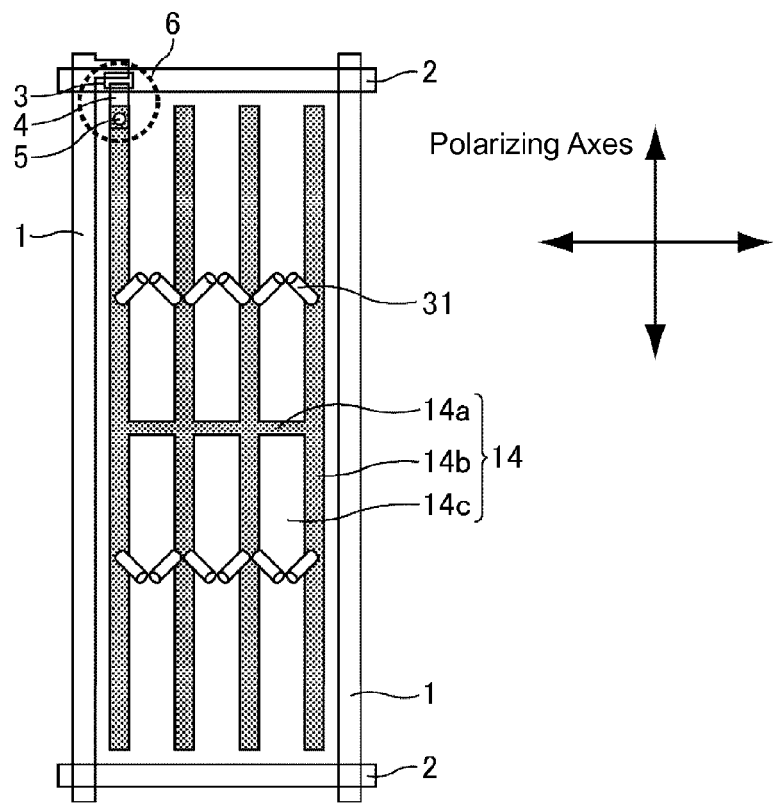
FIG. 6 is a schematic plan view of one pixel of the liquid crystal display device according to Embodiment 1 when a white image is being displayed.

Display of a white image will be described with reference to FIGS. 5 and 6. FIGS. 5 and 6 are schematic drawings showing a liquid crystal display device of Embodiment 1 when a white image is being displayed; FIG. 5 is a schematic cross-sectional view, and FIG. 6 is a schematic plan view of one pixel. In FIG. 5, the double-headed arrows represent the direction of the electric field.

In FIG. 5, an example is shown in which a potential of 0V is applied to the first common electrode 12, a potential of ±7.5V is applied to the second common electrode 22, and a potential of ±4.5 is applied to the pixel electrode ($|V_1|$=7.5, $|V_2|$=4.5). As shown in FIG. 5, a vertical electric field and a horizontal electric field (oblique electric field) are formed in the liquid crystal layer 30, and the liquid crystal molecules 31 rotate to respectively different azimuths while maintaining a horizontal orientation with respect to the surfaces of the first substrate 10 and the second substrate 20. As shown in FIG. 6, when viewed in a plan view, the liquid crystal molecules 31 are at azimuths at angles with respect to the lengthwise direction of the slits 14c of the pixel electrode. As a result, the liquid crystal molecules 31 are at an angle with respect to the polarizing axes of the polarizing plate, and thus, light from the backlight passes through, and a grayscale image or a white image can be displayed.

More specifically, the liquid crystal molecules 31 are oriented to have line symmetry about the trunk portion 14a of the pixel electrode 14 while facing the open ends of the slits 14c of the pixel electrode. Also, the liquid crystal molecules 31 are oriented to have line symmetry about the center of the respective slits 14c. As a result, the liquid crystal molecules 31 are at four different azimuths within one pixel, which can further improve viewing angle characteristics. This is due to the fact that the pixel electrodes 14 have a trunk portion 14a that crosses the center of the pixel.

If $|V_2|$ becomes greater than $|V_1|$ when a grayscale image or a white image is being displayed, no vertical electric field is formed in the liquid crystal layer, and the liquid crystal molecules 31 no longer maintain a horizontal orientation with respect to the surfaces of the first substrate 10 and the second substrate 20, and thus, transmittance and contrast ratio decrease. Thus, $|V_2|$ must remain below $|V_1|$.

Thus, excellent display can be attained if $V_2$ changes according to the range in formula (1) below:

(Formula 1)

$$0 < |V_{2\_B}| \leq |V_2| < |V_1| \qquad (1)$$

Materials of respective members and a manufacturing method will be described below.

A transparent material such as glass or plastic is suitable for the support substrates 11 and 21.

The first common electrode 12, the second common electrode 22, and the pixel electrodes 14 can be made by forming a single layer or multiple layers of a transparent conductive material such as indium tin oxide (ITO), indium zinc oxide (IZO), zinc oxide (ZnO), and tin oxide (SnO), or an alloy thereof by sputtering, and then patterning the material by photolithography or the like, for example. The slits 14c of the pixel electrode 14 can also be formed simultaneously to this during patterning.

The first substrate 10 and the second substrate 20 manufactured in this manner are provided with a plurality of columnar spacers made of an insulating material and then bonded together by a sealing member. The liquid crystal layer 30 is formed between the first substrate 10 and the second substrate 20, but when using the dripping method, the liquid crystal is dripped onto a substrate prior to the substrates being bonded, and when using the vacuum injection method, the liquid crystal is injected after the substrates have been bonded. By bonding polarizing plates, phase contrast films, or the like onto the surfaces of the substrates opposite to the liquid crystal layer 30, the liquid crystal display device is completed. Furthermore, by mounting a gate driver, a source driver, a display control circuit, and the like and adding a backlight or the like, a liquid crystal display device suited to a given application is completed.

The structure of the liquid crystal display device of Embodiment 1 can be confirmed using a scanning electron microscope (SEM), for example.

The dielectric anisotropy of the liquid crystal molecules 31 can be confirmed by analyzing the molecular structure of the liquid crystal by gas chromatography, for example.

An actual liquid crystal display device of Working Example 1 was manufactured as an example of Embodiment 1. The dielectric anisotropy ($\Delta\epsilon$) of the liquid crystal was −7.1, the permittivity ($\epsilon_\perp$) in the direction perpendicular to the director direction of the liquid crystal was 11.3, the refraction anisotropy ($\Delta n$) was 0.11, and the permittivity ($\epsilon_1$) of the insulating layer 13 was 6.9. Also, the thickness ($d_{LC}$) of the liquid crystal layer 30 was 3.2 μm, the thickness ($d_1$) of the insulating layer 13 was 0.3 μm, the width of each of the teeth 14b of the pixel electrode was 6 μm, and the width of each slit 14c was 10 μm.

With a potential of 0V being applied to the first common electrode 12 and a potential of |7.5|V being applied to the second common electrode 22, the transmittance was measured as different potentials were applied to the pixel electrode 14.

Figure 7:
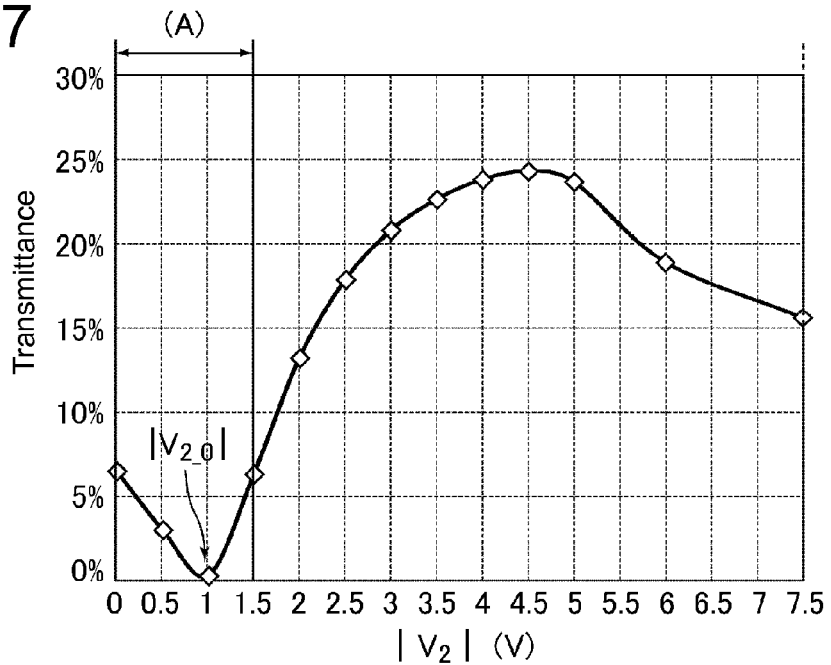
FIG. 7 is a graph showing V-T characteristics of a liquid crystal display device according to Working Example 1.

FIG. 7 is a graph representing the relation (V-T characteristics) between the potential difference between the first common electrode and the pixel electrode ($V_2$) and the transmittance in the liquid crystal display device of Working Example 1. As shown in FIG. 7, in Working Example 1, $|V_2|$ at the lowest transmittance ($|_{2\_0}|$) is 1V, and when $|V_2|$ rises from $|V_{2\_0}|$ (1V) and approaches $|V_1|$ (7.5V), the transmittance increases, with the maximum being when $|V_2|=4.5V$. Thus, in Working Example 1, $|V_2|$ during black image display ($|V_{2\_B}|$) is 1V, and $|V_2|$ during white image display is 4.5V. $|V_{2\_B}|$ simply needs to be in the range specified by formulae (2) and (5) as in (A) of FIG. 7. According to the conditions above, the relations of formulae (1) and (2) are satisfied, thereby achieving a liquid crystal display device having excellent viewing angle characteristics and high contrast ratio.

Embodiment 2

Figure 8:
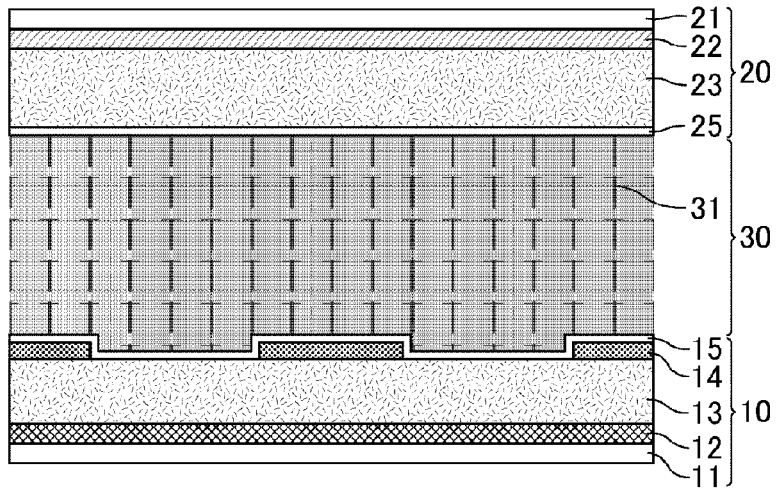
FIG. 8 is a schematic cross-sectional view of a liquid crystal display device according to Embodiment 2 when no voltage is applied.

Embodiment 2 is similar to Embodiment 1 other than that a second insulating layer is present between the second common electrode and the alignment film. FIG. 8 is a schematic cross-sectional view of a liquid crystal display device according to Embodiment 2 when no voltage is applied.

As shown in FIG. 8, the liquid crystal display device of Embodiment 2 has a second insulating layer 23. The second insulating layer 23 can be made of an organic film including an organic material such as an acrylic resin (permittivity $\epsilon$=3 to 4), an inorganic film including an inorganic material such as silicon nitride (permittivity $\epsilon$=5 to 7), or the like. The second insulating layer 23 is 0.2 to 2 μm in thickness, for example, and more preferably 0.3 to 1.5 μm in thickness. The driving principles are similar to those of Embodiment 1.

In Embodiment 2, a potential greater than 0V is applied to the pixel electrode 14 during black display. If a 0V potential is applied to the first common electrode 12 and a potential of ±7.5 is applied to the second common electrode 22, with the potential applied to the pixel electrode 14 being gradually increased from 0V, then when the potential difference between the pixel electrode 14 and the first common electrode 12 reaches a certain value, an equipotential plane parallel to the substrate surface is formed over the teeth 14b and the slit 14c of the pixel electrode in the vicinity of the boundary between the first substrate 10 and the liquid crystal layer 30, thereby forming an even vertical electric field in the liquid crystal layer 30.

If $V_2$ when an even vertical electric field is formed in the liquid crystal layer 30 is $V_{2\_0}$, then $V_2$ is represented by formula (6) below:

(Formula 6)

$$V_2 = \frac{\varepsilon_2 \varepsilon_\perp d_1}{\varepsilon_1 \varepsilon_\perp d_2 + \varepsilon_1 \varepsilon_2 d_{LC} + \varepsilon_2 \varepsilon_\perp d_1} V_1 (= V_{2\_0}) \quad (6)$$

($d_{LC}$ represents the thickness of the liquid crystal layer, $\varepsilon_\perp$ represents the permittivity in the direction perpendicular to the director of the liquid crystal, $d_1$ represents the thickness of the first insulating layer, $d_2$ represents the thickness of the second insulating layer, $\varepsilon_1$ represents the permittivity of the first insulating layer, and $\varepsilon_2$ represents the permittivity of the second insulating layer)

In the liquid crystal display device of Embodiment 2, if the potential difference between the first common electrode 12 and the pixel electrode 14 is $V_{2\_B}$ for black image display, then it is preferable that $V_{2\_B}$ be within the range set in formula (5) below, as in Embodiment 1:

(Formula 5)

$$0 < |V_{2\_B}| \leq |V_{2\_0}| + 0.5 \quad (5)$$

In other words, it is preferable that $V_{2\_B}$ be within the range of formula (3) below:

(Formula 3)

$$0 < |V_{2\_B}| \leq \frac{\varepsilon_2 \varepsilon_\perp d_1}{\varepsilon_1 \varepsilon_\perp d_2 + \varepsilon_1 \varepsilon_2 d_{LC} + \varepsilon_2 \varepsilon_\perp d_1} |V_1| + 0.5 \quad (3)$$

Similar to Embodiment 1, if, during grayscale or white image display, $|V_2|$ exceeds $|V_1|$, then a vertical electric field is not formed in the liquid crystal layer 30, and the liquid crystal molecules 31 no longer stay in a horizontal orientation with respect to the surfaces of the first substrate 10 and the second substrate 20, which results in a decrease in transmittance and contrast ratio. Thus, $|V_2|$ must remain below $|V_1|$.

Thus, excellent display can be attained if $V_2$ changes according to the range in formula (1) below:

(Formula 1)

$$0 < |V_{2\_B}| \leq |V_2| < |V_1| \quad (1)$$

An actual liquid crystal display device of Working Example 2 was manufactured as an example of Embodiment 2. The dielectric anisotropy ($\Delta\varepsilon$) of the liquid crystal was −7.1, the permittivity ($\varepsilon_\perp$) in the direction perpendicular to the director direction of the liquid crystal was 11.3, the refraction anisotropy ($\Delta n$) was 0.11, the permittivity ($\varepsilon_1$) of the first insulating layer 13 was 6.9, and the permittivity ($\varepsilon_2$) of the second insulating layer 23 was 3.8. The thickness ($d_{LC}$) of the liquid crystal layer 30 is 3.2 μm, the thickness ($d_1$) of the first insulating layer 13 was 0.3 μm, the thickness ($d_2$) of the second insulating layer 23 was 1 μm, the width of each of the teeth 14b of the pixel electrode was 6 μm, and the width of the slit 14c was 10 μm.

With a potential of 0V being applied to the first common electrode 12 and a potential of |7.5|V being applied to the second common electrode 22, the transmittance was measured as different potentials were applied to the pixel electrode 14.

Figure 9:
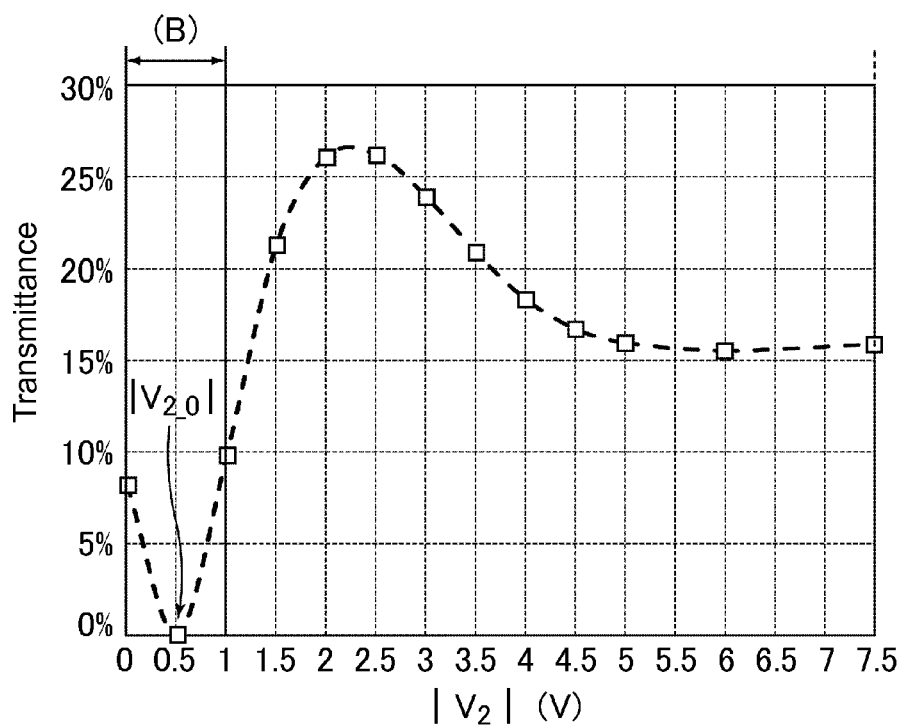
FIG. 9 is a graph showing V-T characteristics of a liquid crystal display device according to Working Example 2.

FIG. 9 is a graph representing the relation (V-T characteristics) between the potential difference between the first common electrode and the pixel electrode ($V_2$) and the transmittance in the liquid crystal display device of Working Example 2. As shown in FIG. 9, in Working Example 2, $|V_2|$ at the lowest transmittance ($|V_{2\_0}|$) was 0.5V, and as $|V_2|$ increased from $|V_{2\_0}|$ (0.5V) and approached $|V_1|$ (7.5V), the transmittance increased to a maximum when $|V_2|$=2.2V. Thus, in Working Example 2, $|V_2|$ during black image display ($V_{2\_B}$) was 0.5V, and $|V_2|$ during white image display was 2.2V. $|V_{2\_B}|$ simply needs to be in the range specified by formulae (3) and (5) as in (B) of FIG. 9. According to the conditions above, the relations of formulae (1) and (3) are satisfied, thereby achieving a liquid crystal display device having excellent viewing angle characteristics and high contrast ratio.

(Evaluation Test 1)

Figure 10:
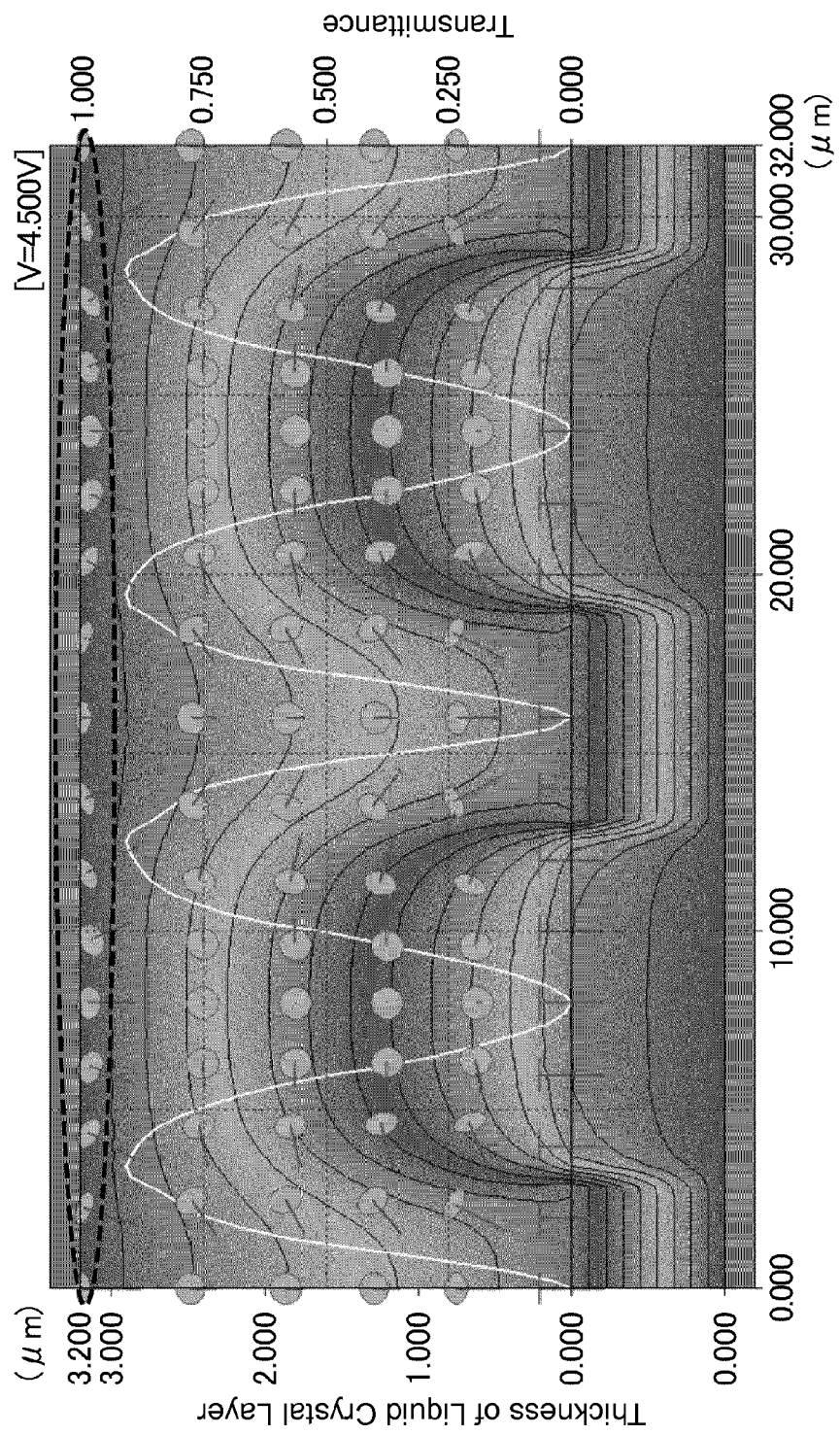
FIG. 10 is a cross-sectional image of the liquid crystal display device of Working Example 1 when a white image is being displayed.
Figure 11:
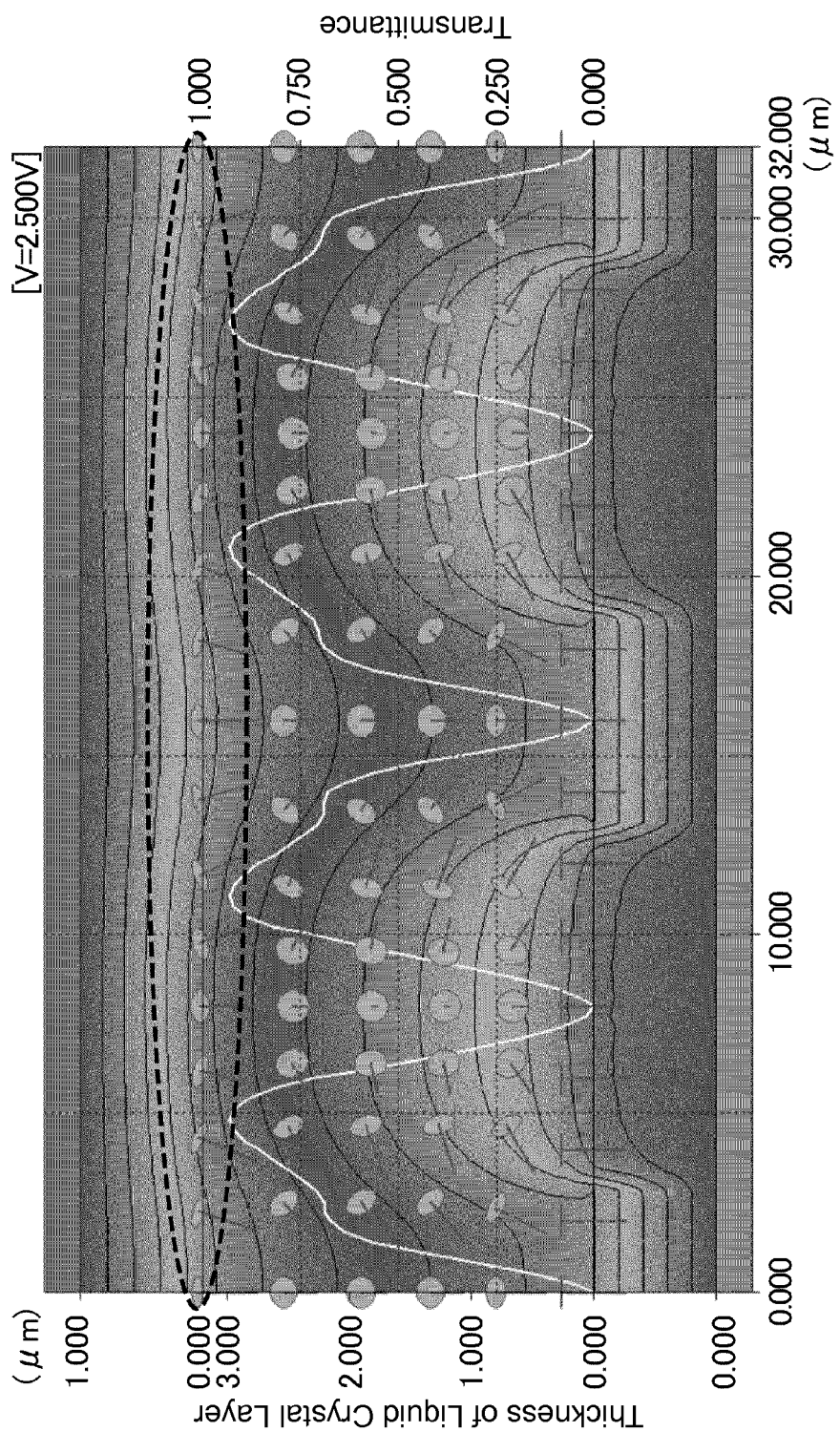
FIG. 11 is a cross-sectional image of the liquid crystal display device of Working Example 2 when a white image is being displayed.
Figure 12:
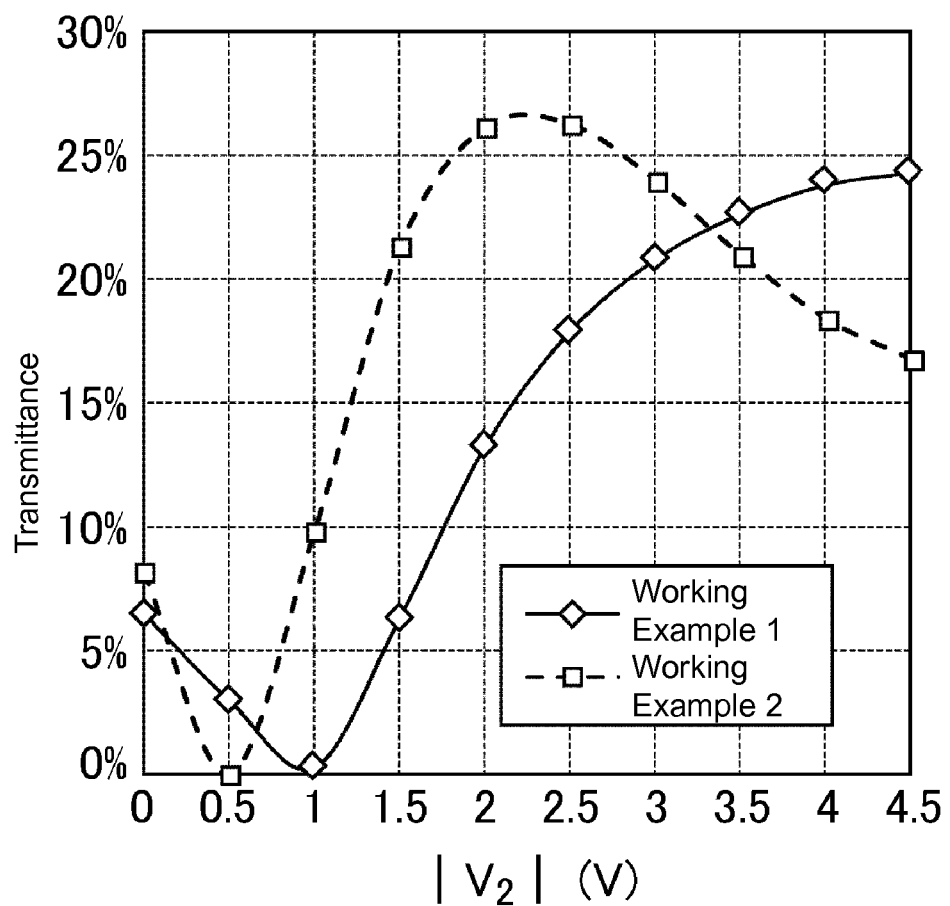
FIG. 12 is a graph comparing V-T characteristics of the liquid crystal display devices of Working Example 1 and Working Example 2.

Below, the results of a comparison between Working Example 1 and Working Example 2 will be described. FIGS. 10 and 11 are respectively cross-sectional images simulating the orientation of liquid crystal during white display in the liquid crystal display devices of Working Examples 1 and 2. FIGS. 10 and 11 were made using an orientation simulator "LCD master" manufactured by Shintech. FIG. 12 is a graph comparing the V-T characteristics of the liquid crystal display devices of Working Examples 1 and 2 based on FIGS. 7 and 9.

When comparing the respective boundaries between the second substrates and the liquid crystal layers in FIGS. 10 and 11 (areas surrounded by the dotted lines in FIGS. 10 and 11), it was found that whereas an equipotential plan parallel to the substrate surface is formed in FIG. 10, a plurality of equipotential planes not parallel to the substrate surface are present in FIG. 11. Also, as shown in FIG. 12, in Working Example 2, the maximum transmittance was achieved with a smaller value for $|V_2|$ compared to Working Example 1, and the maximum transmittance of Working Example 2 was greater than the maximum transmittance of Working Example 1.

It is thought that in the liquid crystal display device of Working Example 1, the electric field distribution is less susceptible to change in the area surrounded by the dotted line in FIG. 10 because a second insulating layer is not present between the second common electrode 22 and the vertical alignment film 25. On the other hand, in the liquid crystal display device of Working Example 2, the second insulating layer 23 is present between the second common electrode 22 and the vertical alignment film 25, and thus, regions where the electric field distribution varies are present in the area surrounded by the dotted line in FIG. 11, allowing the liquid crystal molecules to move more readily, which is thought to be why the increase transmittance is steeper and the maximum transmittance is greater than in Working Example 1.

Thus, according to Embodiment 2, a higher transmittance is achieved with a lower $|V_2|$ than in Embodiment 1, and therefore, it is possible to drive the liquid crystal display device at a lower voltage.

Embodiment 3

Figure 13:
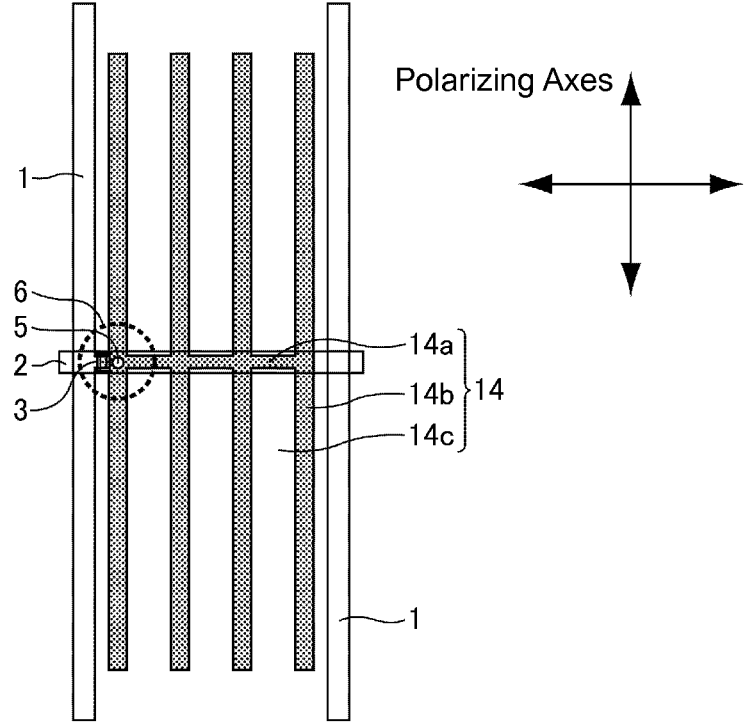
FIG. 13 is a schematic plan view of one pixel of the liquid crystal display device of Embodiment 3.

Embodiment 3 is similar to Embodiment 1 other than the arrangement of scan signal lines. FIG. 13 is a schematic plan view of one pixel of the liquid crystal display device of Embodiment 3.

As shown in FIG. 13, in Embodiment 3, the pixel electrode 14 is provided for each pixel such that the trunk portion 14a thereof corresponds in position to the scan signal line 2. The plurality of data signal lines 1 extend in the vertical direction of the liquid crystal display device, the plurality of scan signal lines 2 extend in the horizontal direction of the liquid crystal display device so as to cross the middle of each pixel, and the TFTs 6 are respectively formed in the vicinity of the respective intersections between the data signal lines 1 and the scan signal lines 2. The TFTs 6 are constituted of respective portions of the data signal line 1 and the scan signal line 2, and the semiconductor layer 3, and function as a switching element. The pixel electrode 14 is connected to the scan signal line 2 through a contact hole 5. When the TFT 6 is turned ON by a scan signal supplied through the scan signal line 2, the semiconductor layer 3 becomes conductive, and a data signal is supplied to the pixel electrode 14 through the data signal line 1.

In Embodiment 3 also, a liquid crystal display device having excellent viewing angle characteristics and high contrast can be achieved by using a design that satisfies the relations of formulae (1) and (2).

Embodiment 4

Figure 14:
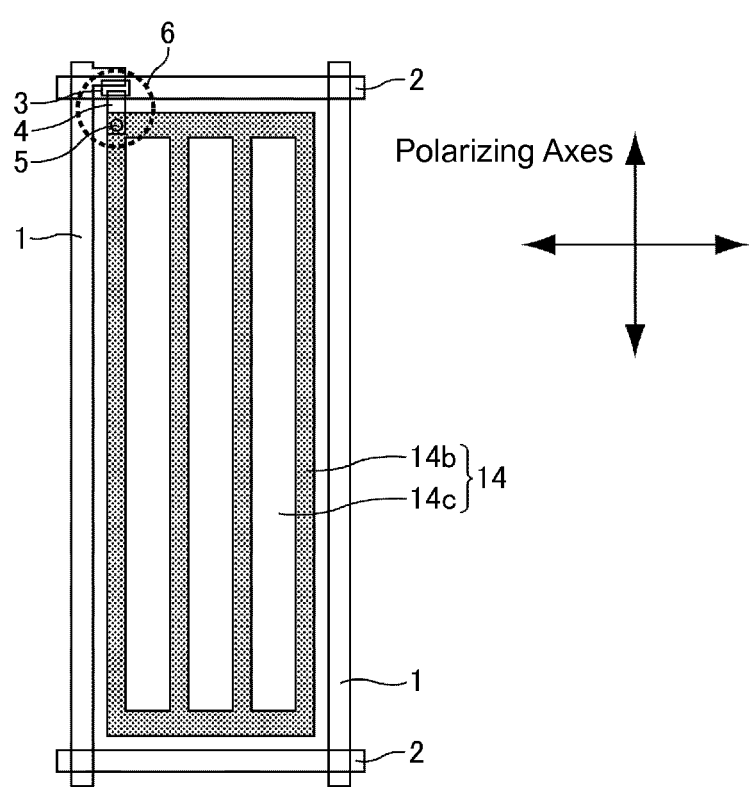
FIG. 14 is a schematic plan view of one pixel of the liquid crystal display device of Embodiment 4.

Embodiment 4 is similar to Embodiment 1 other than the structure of the pixel electrodes 14. FIG. 14 is a schematic plan view of one pixel of the liquid crystal display device of Embodiment 4. As shown in FIG. 14, in Embodiment 4, the pixel electrode 14 has teeth 14b and slits 14c, but the teeth of the pixel electrodes are not connected at the middle, and the slits 14c are closed off at the upper and lower ends of the pixel electrode.

In Embodiment 4, by using a design that satisfies the relations of formulae (1) and (2), a liquid crystal display device having viewing angle characteristics that are slightly worse than Embodiment 1 but still excellent, and a high contrast ratio can be achieved.

Embodiment 5

Figure 15:
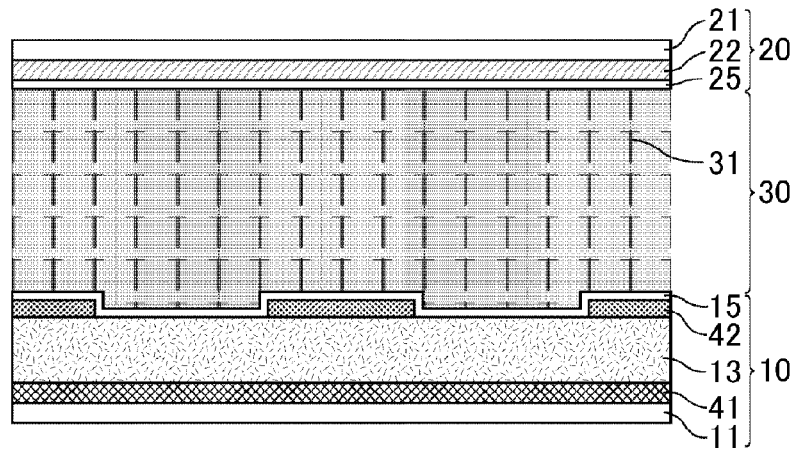
FIG. 15 is a schematic cross-sectional view of a liquid crystal display device according to Embodiment 5 when no voltage is applied.

Embodiment 5 is similar to Embodiment 1 except that the first electrode is the pixel electrode and that the second electrode and the third electrode are common electrodes. FIG. 15 is a schematic cross-sectional view of a liquid crystal display device according to Embodiment 5 when no voltage is applied.

As shown in FIG. 15, the liquid crystal display device of Embodiment 5 includes a first substrate 10, a second substrate 20, and a liquid crystal layer 30 sandwiched between the first substrate 10 and the second substrate 20. The liquid crystal layer 30 contains liquid crystal molecules 31 having a negative dielectric anisotropy. The first substrate 10 includes a support substrate 11, thin film transistors (TFTs), data signal lines, scan signal lines, pixel electrodes 41 (first electrodes), a first common electrode 42 (second electrode), an insulating layer 13 (first insulating layer) that electrically separates the pixel electrodes 41 from the first common electrode 42, and a vertical alignment film 15. The second substrate 20 includes a support substrate 21, a second common electrode 22 (third electrode), a vertical alignment film 25, color filters, and a black matrix.

In Embodiment 5, the configuration of the first common electrode 42 is similar to that of the pixel electrodes 12 of Embodiment 1. The pixel electrodes 41 are formed in a uniformly planar manner for each pixel and are supplied data signals through respective data signal lines. The first common electrode 42 and the second common electrode 22 are respectively applied differing common potentials.

In Embodiment 5 also, a liquid crystal display device having excellent viewing angle characteristics and high contrast can be achieved by using a design that satisfies the relations of formulae (1) and (2).

Embodiment 6

Figure 16:
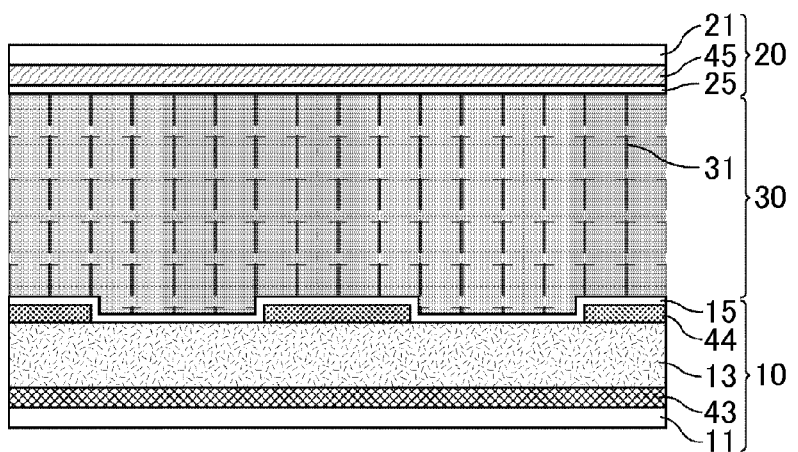
FIG. 16 is a schematic cross-sectional view of a liquid crystal display device according to Embodiment 6 when no voltage is applied.

Embodiment 6 is similar to Embodiment 1 except that the first electrode and the second electrode are pixel electrodes and that the third electrode is a common electrode. FIG. 16 is a schematic cross-sectional view of a liquid crystal display device according to Embodiment 6 when no voltage is applied.

As shown in FIG. 16, the liquid crystal display device of Embodiment 6 includes a first substrate 10, a second substrate 20, and a liquid crystal layer 30 sandwiched between the first substrate 10 and the second substrate 20. The liquid crystal layer 30 contains liquid crystal molecules 31 having a negative dielectric anisotropy. The first substrate 10 includes a support substrate 11, thin film transistors (TFTs), data signal lines, scan signal lines, first pixel electrodes 43 (first electrodes), second pixel electrodes 44 (second electrodes), an insulating layer 13 (first insulating layer) that electrically separates the first pixel electrodes 43 from the second pixel electrodes 44, and a vertical alignment film 15. The second substrate 20 includes a support substrate 21, a common electrode 45 (third electrode), a vertical alignment film 25, color filters, and a black matrix.

In Embodiment 6, the configuration of the common electrode 45 is similar to that of the second common electrode 22 of Embodiment 1, and the configuration of the second pixel electrode 44 is similar to that of the pixel electrode 12 of Embodiment 1. The first pixel electrode 43 is formed in a uniformly planar shape for each pixel. The first pixel electrode 43 and the second pixel electrode 44 may be respectively connected to different TFTs and supplied data signals through the data signal lines.

In Embodiment 6 also, a liquid crystal display device having excellent viewing angle characteristics and high contrast can be achieved by using a design that satisfies the relations of formulae (1) and (2).

Embodiment 7

Figure 17:
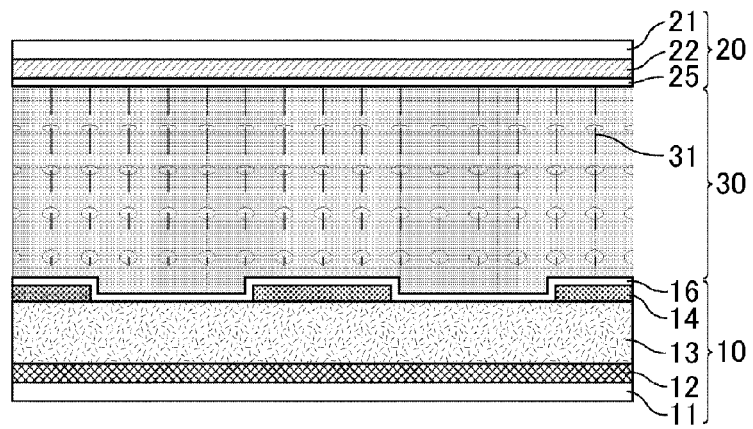
FIG. 17 is a schematic cross-sectional view of a liquid crystal display device according to Embodiment 7 when no voltage is applied.
Figure 18:
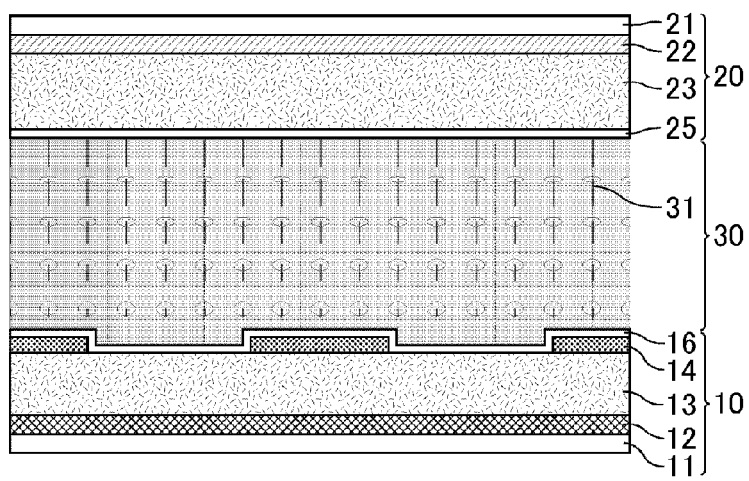
FIG. 18 is a schematic cross-sectional view of a liquid crystal display device according to Embodiment 7 when no voltage is applied.
Figure 19:
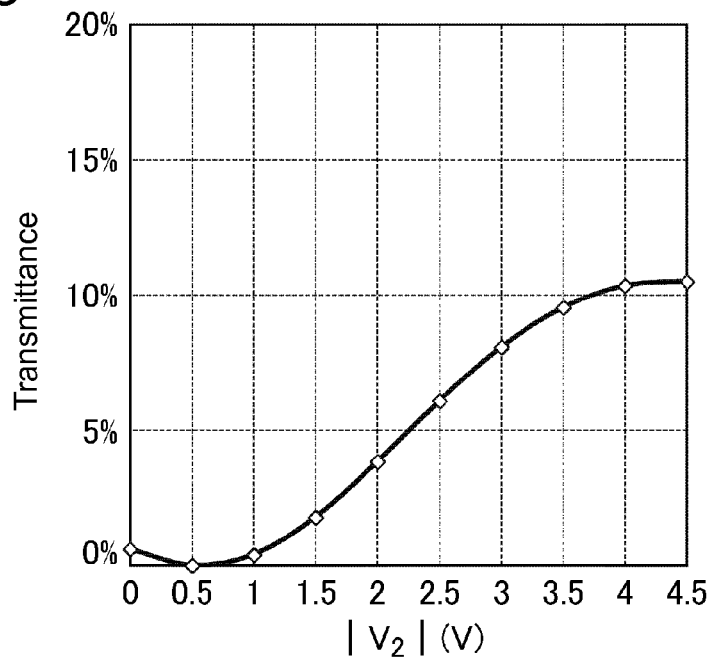
FIG. 19 is a graph showing V-T characteristics of the liquid crystal display device shown in FIG. 18.

Embodiment 7 is similar to Embodiments 1 and 2 except that the liquid crystal molecules are of a hybrid alignment type in which liquid crystal molecules close to the first substrate are oriented horizontally with respect to the surface of the first substrate and the liquid crystal molecules close to the second substrate are oriented vertically with respect to the second substrate. FIGS. 17 and 18 are schematic cross-sectional views of a liquid crystal display device according to Embodiment 7 when no voltage is applied. FIG. 19 is a graph showing V-T characteristics of the liquid crystal display device shown in FIG. 18. The aspect shown in FIG. 17 does not have a second insulating layer between the second common electrode and the alignment film as in Embodiment 1, but the aspect shown in FIG. 18 has the second insulating layer between the second common electrode and the alignment film as in Embodiment 2.

In FIGS. 17 and 18, the first substrates 10 both have horizontal alignment films 16, and the second substrates 20 both have vertical alignment films 25. An alignment treatment is performed on the horizontal alignment film 16 and the vertical alignment film 25 such that the orientation azimuth of the liquid crystal molecules 31 is parallel to the lengthwise direction of the slits 14c of the pixel electrode 14.

By controlling the azimuth of the liquid crystal molecules 31 during black image display in this manner, it is possible to control display by driving principles similar to those of Embodiments 1 and 2. The aspect of FIG. 17 is designed to satisfy the conditions of formulae (1) and (2), and the aspect of FIG. 18 is designed to satisfy the conditions of formulae (1) and (3). As shown in FIG. 19, an excellent gradation display is attained even with the aspect of FIG. 18. According to Embodiment 7, it is possible to attain an excellent display similar to Embodiments 1 and 2.

Embodiment 8

Figure 20:
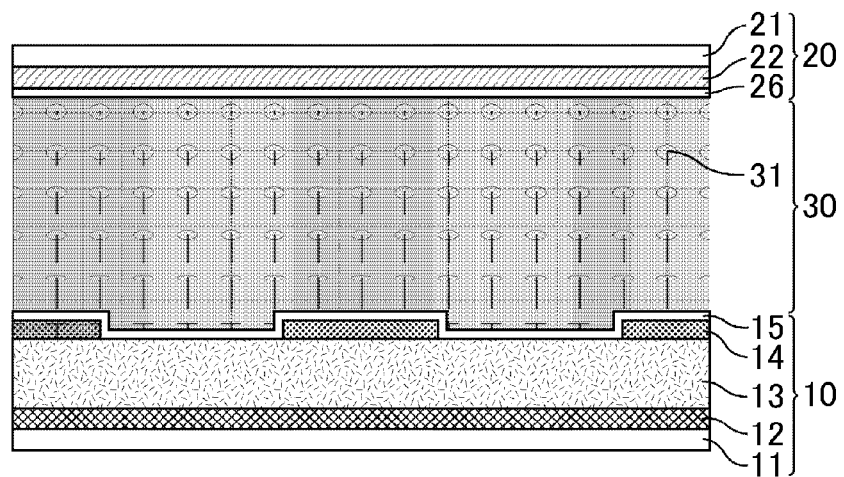
FIG. 20 is a schematic cross-sectional view of a liquid crystal display device according to Embodiment 8 when no voltage is applied.
Figure 21:
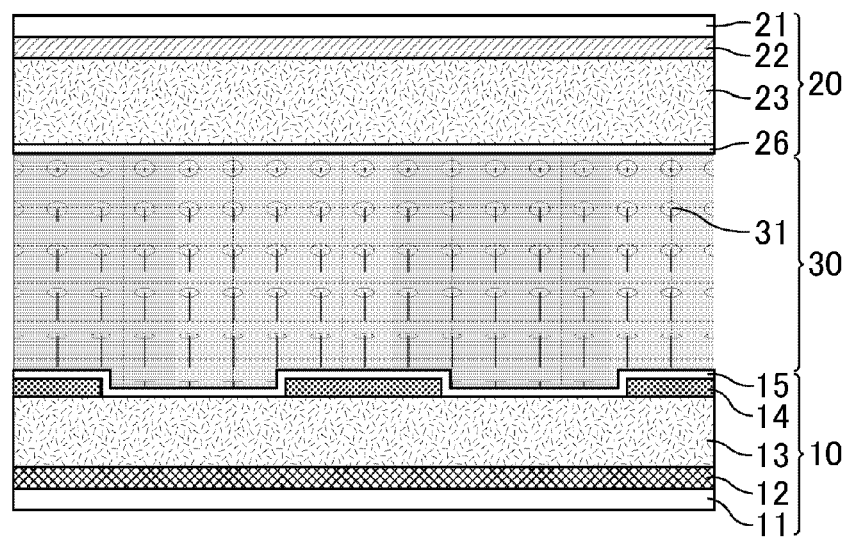
FIG. 21 is a schematic cross-sectional view of a liquid crystal display device according to Embodiment 8 when no voltage is applied.
Figure 22:
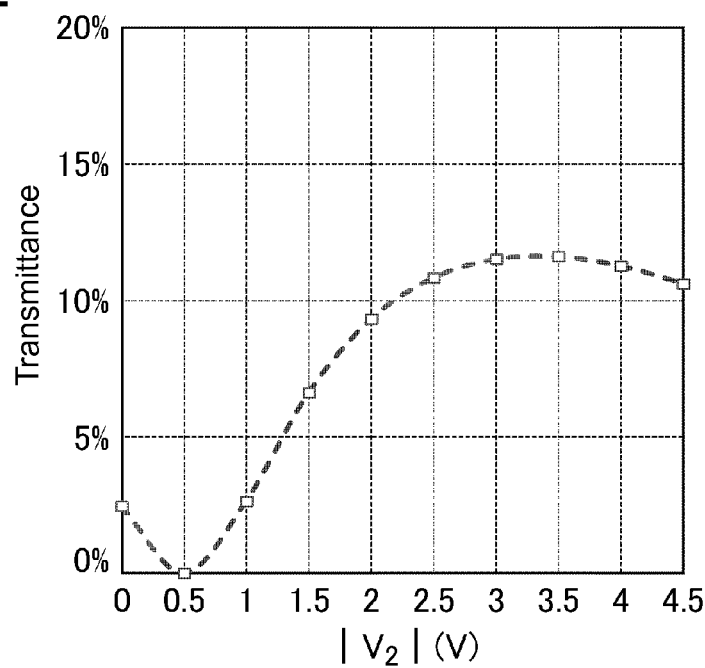
FIG. 22 is a graph showing V-T characteristics of the liquid crystal display device shown in FIG. 21.

Embodiment 8 is similar to Embodiments 1 and 2 except that the liquid crystal molecules are of a hybrid alignment type in which liquid crystal molecules close to the first substrate are oriented horizontally with respect to the surface of the first substrate and the liquid crystal molecules close to the second substrate are oriented vertically with respect to the second substrate. FIGS. 20 and 21 are schematic cross-sectional views of a liquid crystal display device according to Embodiment 8 when no voltage is applied. FIG. 22 is a graph showing V-T characteristics of the liquid crystal display device shown in FIG. 21. The aspect shown in FIG. 20 does not have a second insulating layer between the second common electrode and the alignment film as in Embodiment 1, but the aspect shown in FIG. 21 has the second insulating layer between the second common electrode and the alignment film as in Embodiment 2.

In FIGS. 20 and 21, the first substrates 10 both have vertical alignment films 15, and the second substrates 20 both have horizontal alignment films 26. An alignment treatment is performed on the horizontal alignment film 26 and the vertical alignment film 25 such that the orientation azimuth of the liquid crystal molecules 31 is parallel to the lengthwise direction of the slits 14c of the pixel electrode 14.

By controlling the azimuth of the liquid crystal molecules 31 during black image display in this manner, it is possible to control display by driving principles similar to those of Embodiments 1 and 2. The aspect of FIG. 20 is designed to satisfy the conditions of formulae (1) and (2), and the aspect of FIG. 21 is designed to satisfy the conditions of formulae (1) and (3). As shown in FIG. 22, an excellent gradation display is attained even with the aspect of FIG. 21. According to Embodiment 8, it is possible to attain an excellent display similar to Embodiments 1 and 2.

Comparing FIGS. 19 and 22, when adopting so-called hybrid alignment, the liquid crystal display device can be driven at a lower voltage and with a higher transmittance if the liquid crystal molecules close to the first substrate are vertically aligned with respect to the surface of the first substrate than if the liquid crystal molecules close to the first substrate are horizontally aligned with respect to the surface of the first substrate when no voltage is applied.

Comparison Example 1

Figure 23:
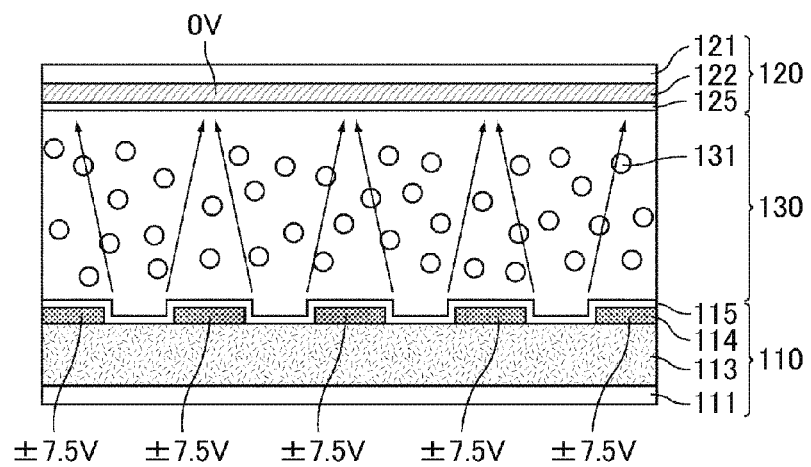
FIG. 23 is a schematic cross-sectional view of the liquid crystal display device according to Comparison Example 1 when a white image is being displayed.
Figure 24:
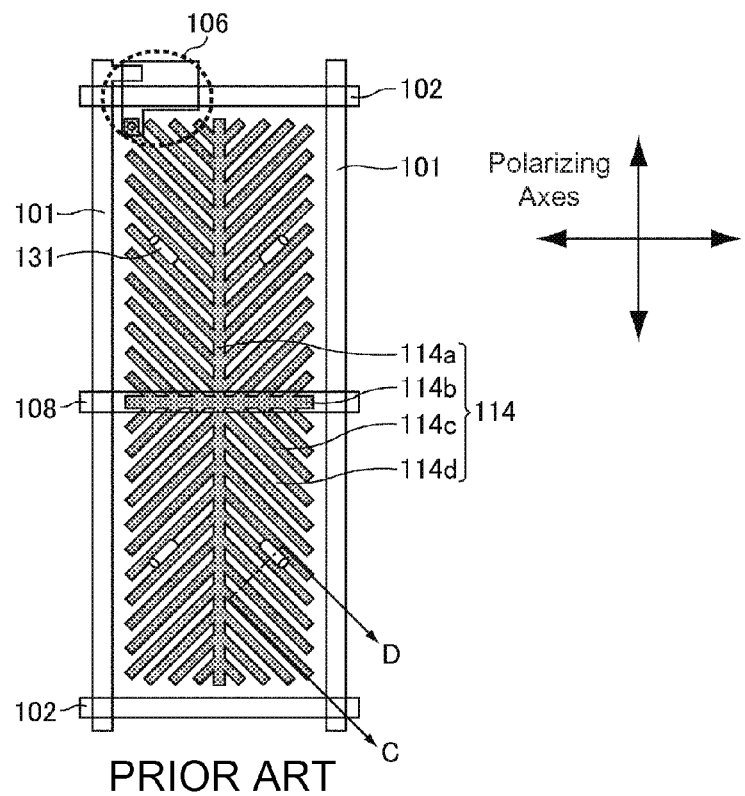
FIG. 24 is a schematic plan view of one pixel of the liquid crystal display device according to Comparison Example 1 when a white image is being displayed.

A liquid crystal display device of Comparison Example 1 is one aspect of a conventional vertical alignment type liquid crystal display device. FIGS. 23 and 24 are schematic views of the liquid crystal display device of Comparison Example 1 during white image display; FIG. 23 is a schematic cross-sectional view, and FIG. 24 is a schematic plan view of one pixel. FIG. 23 is also a schematic cross-sectional view of FIG. 24 along the line C-D. In FIG. 23, the arrows in the liquid crystal layer represent the direction of the electric field.

As shown in FIG. 23, the liquid crystal display device of Comparison Example 1 includes a first substrate 110, a second substrate 120, and a liquid crystal layer 130 sandwiched between the first substrate 110 and the second substrate 120. The liquid crystal layer 130 contains liquid crystal molecules 131 having a negative dielectric anisotropy. The first substrate 110 includes a support substrate 111, thin film transistors (TFTs), data signal lines, scan signal line storage capacitance bus lines, an insulating layer 113, pixel electrodes 114, and a vertical alignment film 115. Comparison Example 1 differs from Embodiment 1 in that there is no common electrode below the pixel electrodes 114. The second substrate 120 includes a support substrate 121, a uniformly planar common electrode 122, color filters, a black matrix, and a vertical alignment film 125.

As shown in FIG. 24, the pixel electrode 114 is provided for each region surrounded by the data signal lines 101 and the scan signal lines 102. The pixel electrode 114 includes a connecting electrode 114a, a connecting electrode 114b, and a plurality of teeth 114c. Slits 114d are present between adjacent teeth 114c. The connecting electrode 114a is formed parallel to the longer side of the pixel to bisect the pixel horizontally. The connecting electrode 114b is formed parallel to the shorter side of the pixel to bisect the pixel vertically. The storage capacitance bus line 108, like the connecting electrode 114b, is formed parallel to the shorter side of the pixel to bisect the pixel vertically, and is formed to correspond in position to the connecting electrode 114b.

The connecting electrodes 114a and 114b are formed to divide the pixel into four rectangles of the same shape. The plurality of teeth 114c extend at azimuths of 45°, 135°, 225°, and 315° to form 45° angles with the longer side direction of the connecting electrode 114a or the connecting electrode 114b.

An actual liquid crystal display device of Comparative Example 1 was manufactured as an example of Comparison Example 1. The dielectric anisotropy ($\Delta\in$) of the liquid crystal was −7.1, the permittivity ($\in_\perp$) in the direction perpendicular to the director direction of the liquid crystal was 11.3, and the refraction anisotropy ($\Delta n$) was 0.11. The thickness ($d_{LC}$) of the liquid crystal layer 130 was 3.2 μm, the width of each of the teeth 114c of the pixel electrode was 3 μm, and the width of the slit 114d was 3 μm.

Also, in Comparative Example 1, a liquid crystal composition containing liquid crystal and a monomer for PSA (made by Merck) is injected between the first substrate 110 and the second substrate 120, and sealed therein. A |7.5|V potential was applied to the pixel electrode 114, a 0V potential was applied to the common electrode 122, and the liquid crystal molecules 131 were oriented at azimuths parallel to the lengthwise directions of the slits of the pixel electrode 114 so as to have four different orientation azimuths, thereby dividing orientation into four directions. Ultraviolet light was radiated in this state to polymerize the monomer for PSA, thereby forming a polymer on the substrate surface and fixing the azimuths of the liquid crystal molecules. Polarizing plates are bonded to the respective outer surfaces of the first substrate 110 and the second substrate 120 in a crossed Nicols state by having the respective polarizing axes be parallel or perpendicular to the lengthwise directions of the connecting electrode 114a or the connecting electrode 114b.

During black image display, most of the liquid crystal molecules are oriented vertically with respect to the surfaces of the first substrate 110 and the second substrate 120, but some of the liquid crystal molecules close to the respective substrates are oriented in a direction slightly inclined from the direction perpendicular to the substrate surfaces and at azimuths parallel to the lengthwise directions of the slits using the above-mentioned technique for adding pretilt angles using the polymer. In the liquid crystal display device of Comparative Example 1, the potential of both the common electrode 122 and the pixel electrode 114 is 0V during black image display.

As shown in FIG. 23, a 0V common potential is applied to the common electrode 122 and a potential gradually increasing from 0 to |7.5|V is applied to the pixel electrode 114, and it was confirmed that the display shifted from grayscale image display to white image display. In the liquid crystal layer 130, an electric field inclined with respect to the substrate surfaces is formed from the pixel electrode 114 towards the common electrode 122. The liquid crystal molecules 131 have negative dielectric anisotropy and are oriented in a direction perpendicular to the electric field, and thus, the angle of inclination of the liquid crystal molecules 131 with respect to the substrate surfaces changes, which causes the display to shift from grayscale image display to white image display. As shown in FIG. 24, when viewing the liquid crystal display panel in a plan view during white image display, the liquid crystal molecules 131 are oriented in azimuths parallel to the lengthwise directions of the slits 114d formed in the pixel electrode 114. In Comparative Example 1, the orientation azimuths of the liquid crystal molecules 131 are fixed by the slits 114d formed in the pixel electrode and the above-mentioned technique for adding pretilt angles using the polymer.

(Evaluation Test 2)

Figure 25:
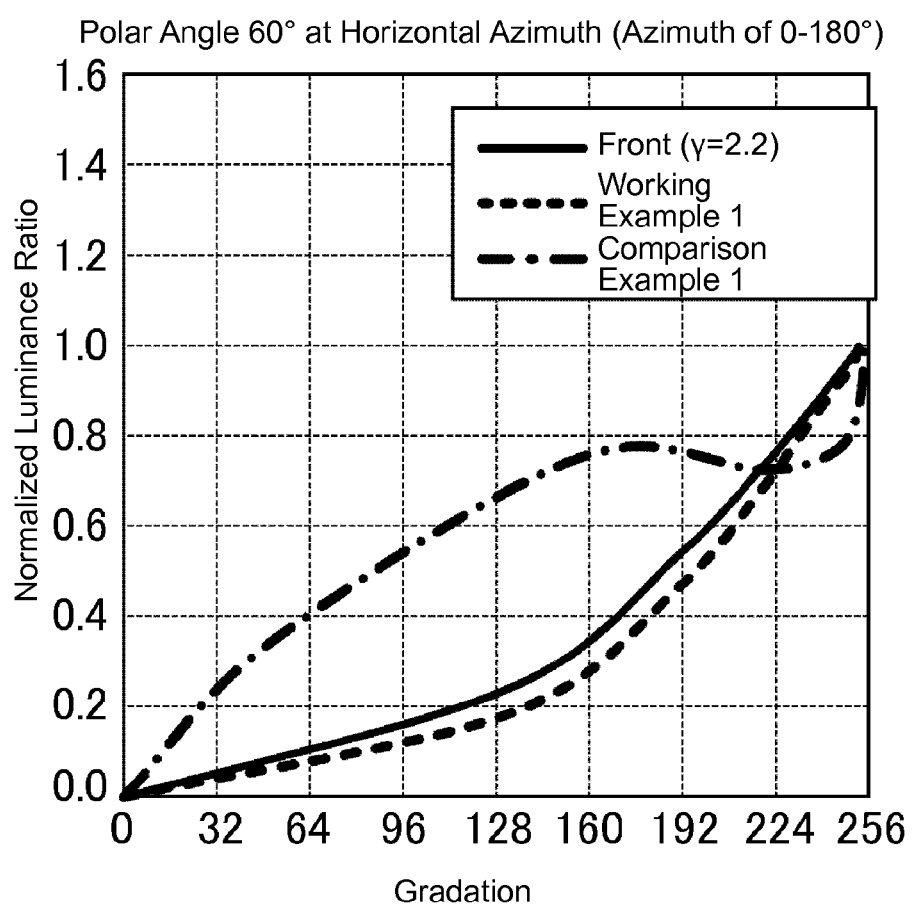
FIG. 25 is a graph showing gamma characteristics at a horizontal azimuth and a polar angle of 60°.
Figure 26:
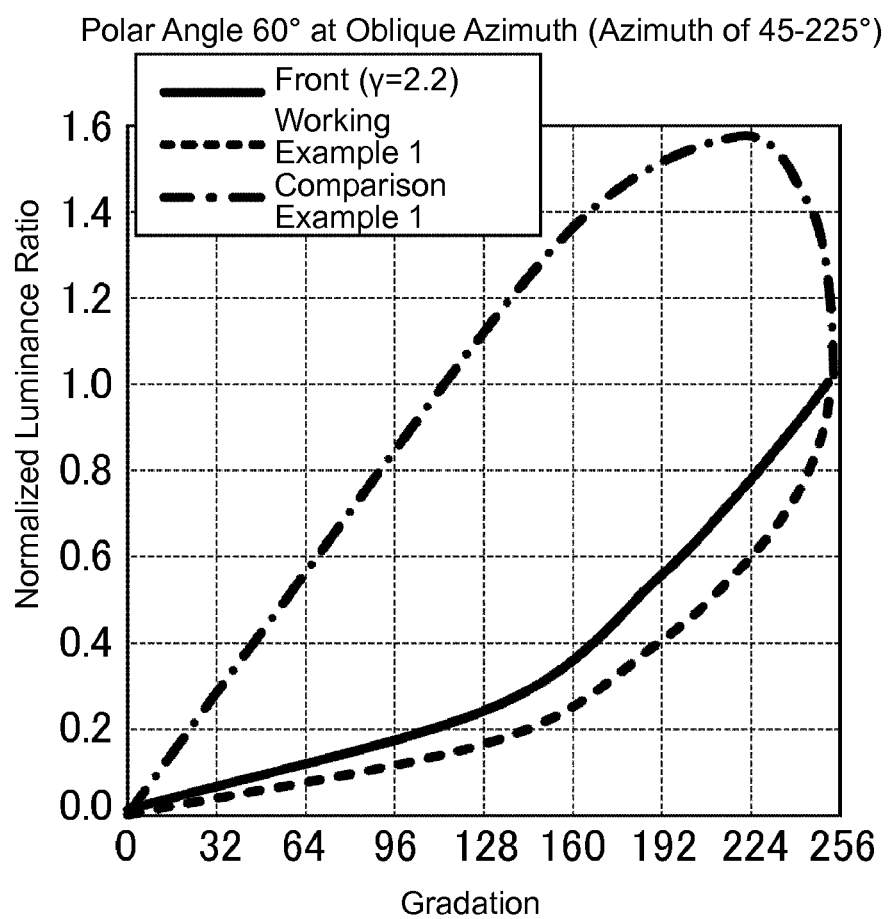
FIG. 26 is a graph showing gamma characteristics of at an oblique azimuth and a polar angle of 60°.

Below, the results of a comparison between Working Example 1 and Comparative Example 1 will be described. FIG. 25 is a graph showing gamma characteristics at a horizontal azimuth (azimuth angle 0-180°) and a polar angle of 60° in the liquid crystal display devices of Working Example 1 and Comparative Example 1, and FIG. 26 is a graph showing gamma characteristics at an oblique azimuth (azimuth angle 45-225°) and a polar angle of 60° in the liquid crystal display devices of Working Example 1 and Comparative Example 1. The gamma characteristics were measured using "EZContrast."

In FIGS. 25 and 26, the vertical axis represents the luminance ratio (normalized luminance ratio) with a gradation of 255 being 1, and the horizontal axis represents the gradation value. In FIGS. 25 and 26, curves showing the frontal gamma characteristics ($\gamma=2.2$) are also included for the comparison. The polar angle is the angle measured between the direction normal to the surface of the substrate and a position inclined towards the substrate surface. The azimuth is an angle where a right azimuth is 0° and a left azimuth is 180° along the surface of the substrate when the surface of the substrate is viewed from the direction normal thereto. Where the azimuth is $\theta$ and the polar angle is $\phi$, then $\theta=\phi=0°$. The closer the curve is to the front gradation ($\gamma=2.2$), the less whitening there is when the liquid crystal display device is viewed from a diagonal direction, and the viewing angle characteristics are excellent.

As shown in FIGS. 25 and 26, the liquid crystal display device of Working Example 1 has similar curves for both the horizontal azimuth and the oblique azimuth as the frontal direction curve ($\gamma=2.2$) for all gradations, and therefore has excellent viewing angle characteristics. On the other hand, in Comparative Example 1, both the horizontal azimuth and the oblique azimuth widely diverge from the frontal direction curve ($\gamma=2.2$) at mid gradation, which results in whitening being observed when the liquid crystal display device is viewed from the diagonal direction.

Below, the differences in viewing angle characteristics between Embodiment 1 and Comparison Example 1 will be discussed.

In Comparison Example 1, a voltage is applied to the liquid crystal layer to form a vertical electric field, thereby orienting the liquid crystal molecules to azimuths parallel to the lengthwise directions of the slits of the pixel electrode. The orientation azimuths of the liquid crystal molecules are determined by the width of the slits, and thus, if the width is the same for all slits, then the orientation azimuths of the liquid crystal molecules are also uniform. Also, there is no electrode corresponding to the first common electrode of Embodiment 1 present below the pixel electrode, and thus, it is not possible to change the electric field distribution in the liquid crystal layer. Therefore, in Comparison Example 1, grayscale image display is performed only by changing the tilt angle of the liquid crystal molecules with respect to the substrate surface, and therefore, when viewed from the diagonal direction, the apparent birefringence of the liquid crystal molecules changes. Even if alignment partitioning is performed by the PSA technique described above to orient the liquid crystal molecules at four different azimuths, as shown in FIGS. 25 and 26, the viewing angle characteristics are not good enough.

On the other hand, in Embodiment 1, the first common electrode is present below the pixel electrodes having slits, and thus, it is possible to change the electric field distribution in the liquid crystal layer by changing the potential between the first common electrode and the pixel electrodes. Therefore, even if the width is the same for all slits in the pixel electrode, it is possible to control the azimuths at which the liquid crystal molecules are oriented. In Embodiment 1, the electric field distribution is changed in the liquid crystal layer to change the azimuths of the liquid crystal molecules during gradation display, and thus, at all gradations, the liquid crystal molecules are oriented horizontally with respect to the substrate surface. Therefore, even when viewed from the diagonal direction, the apparent birefringence of the liquid crystal molecules does not change, which allows for excellent viewing angle characteristics.

DESCRIPTION OF REFERENCE CHARACTERS 1, 101 data signal line
2, 102 scan signal line
3 semiconductor layer
4 drain lead-out wiring line
5 contact hole
6, 106 thin film transistor (TFT)
10, 110 first substrate
11, 21, 111, 121 support substrate
12 first common electrode (first electrode)
13, 113 insulating layer (first insulating layer)
14 pixel electrode (second electrode)
14a trunk portion
14b, 114c teeth
14c, 114d slit
114a, 114b connecting electrode
15, 25, 115, 125 vertical alignment film
16, 26 horizontal alignment film
20, 120 second substrate
22 second common electrode (third electrode)
23 second insulating layer
30, 130 liquid crystal layer 31, 131 liquid crystal molecules
41 pixel electrode (first electrode)
42 first common electrode (second electrode)
43 first pixel electrode (first electrode)
44 second pixel electrode (second electrode)
45 common electrode (third electrode)
108 storage capacitance bus line
114 pixel electrode
122 common electrode

What is claimed is:

1. A liquid crystal display device, comprising:
a first substrate and a second substrate opposing each other; and
a liquid crystal layer sandwiched between the first and second substrates,
wherein the liquid crystal layer contains liquid crystal molecules having negative dielectric anisotropy,
wherein the first substrate includes a uniformly planar first electrode, a first insulating layer, and a second electrode provided in a different layer from the first electrode across the first insulating layer,
wherein the second electrode has a plurality of teeth and a plurality of slits separating the teeth,
wherein each of the first and second substrates has a polarizing plate thereon, and polarizing axes of the respective polarizing plates are arranged in a crossed Nicols state with each other, and are perpendicular or parallel to a lengthwise direction of said slits,
wherein the second substrate includes a uniformly planar third electrode, and
wherein the liquid crystal display device is configured such that $V_1$, $V_2$, and $V_{2\_B}$ satisfy the following formula (1) for each of gradation levels being displayed, including white and black displays, where a potential between the first electrode and the third electrode is $V_1$, a potential between the first electrode and the second electrode is $V_2$, and a potential between the first electrode and the second electrode at a lowest gradation is $V_{2\_B}$:

$$0 < |V_{2\_B}| \leq |V_2| < |V_1| \quad (1).$$

2. The liquid crystal display device according to claim 1, wherein the value $V_{2\_B}$ satisfies the following formula (2):

$$0 < |V_{2\_B}| \leq \frac{\varepsilon_\perp d_1}{\varepsilon_1 d_{LC} + \varepsilon_\perp d_1}|V_1| + 0.5, \quad (2)$$

where $d_{LC}$ represents a thickness of the liquid crystal layer, $\varepsilon_\perp$ represents a permittivity in a direction perpendicular to a liquid crystal director, $d_1$ represents a thickness of the first insulating layer, and $\varepsilon_1$ represents a permittivity of the first insulating layer.

3. The liquid crystal display device according to claim 1, wherein the second substrate has an alignment film, wherein a second insulating layer is present between the third electrode and the alignment film, and
wherein the value $V_{2\_B}$ satisfies the following formula (3):

$$0 < |V_{2\_B}| \leq \frac{\varepsilon_2 \varepsilon_\perp d_1}{\varepsilon_1 \varepsilon_\perp d_2 + \varepsilon_1 \varepsilon_2 d_{LC} + \varepsilon_2 \varepsilon_\perp d_1}|V_1| + 0.5, \quad (3)$$

where $d_{LC}$ represents a thickness of the liquid crystal layer, $\varepsilon_\perp$ represents a permittivity in a direction perpendicular to a liquid crystal director, $d_1$ represents a thickness of the first insulating layer, $d_2$ represents a thickness of the second insulating layer, $\varepsilon_1$ represents a permittivity of the first insulating layer, and $\varepsilon_2$ represents a permittivity of the second insulating layer.

4. The liquid crystal display device according to claim 1, wherein a width of each of the slits in the second electrode is 2 to 10 μm.

5. The liquid crystal display device according to claim 1, wherein a width of each of the teeth in the second electrode is 2 to 10 μm.

6. The liquid crystal display device according to claim 1, wherein the second electrode has a trunk portion and the plurality of teeth extend from the trunk portion in a direction perpendicular to a lengthwise direction of the trunk portion while collectively exhibiting linear symmetry about the trunk portion.

7. The liquid crystal display device according to claim 1, wherein at least one of the first substrate and the second substrate has a vertical alignment film.

8. The liquid crystal display device according to claim 7, wherein the first substrate has a horizontal alignment film and the second substrate has the vertical alignment film.

9. The liquid crystal display device according to claim 7, wherein the first substrate has the vertical alignment film and the second substrate has a horizontal alignment film.

10. The liquid crystal display device according to claim 3, wherein the alignment film on the second substrate is a vertical alignment film.

11. The liquid crystal display device according to claim 10, wherein the first substrate has a horizontal alignment film.

12. The liquid crystal display device according to claim 3, wherein the first substrate has a vertical alignment film and the alignment film on the second substrate is a horizontal alignment film.

13. The liquid crystal display device according to claim 1, wherein the plurality of slits are oriented and extend in a same direction.

* * * * *